United States Patent [19]

Tagawa

[11] Patent Number: 5,797,664
[45] Date of Patent: Aug. 25, 1998

[54] ANTI-SKID CONTROL BRAKING SYSTEM FOR FOUR-WHEEL DRIVE VEHICLE WITH FEATURE OF DETERMINATION OF DRIVE STATE

[75] Inventor: Yukio Tagawa, Tochigi, Japan

[73] Assignee: Nissan Motor Co., Ltd., Yokohama, Japan

[21] Appl. No.: 607,604

[22] Filed: Feb. 27, 1996

[30] Foreign Application Priority Data

Feb. 27, 1995 [JP] Japan ................. 7-038536
Feb. 27, 1995 [JP] Japan ................. 7-038537

[51] Int. Cl.$^6$ ................. B60T 8/00
[52] U.S. Cl. ................. 303/190; 701/81; 180/244
[58] Field of Search ................. 303/190, 186, 303/143; 364/426.01, 426.02, 426.03, 426.04; 180/244, 233; 701/81, 89, 78, 79

[56] References Cited

U.S. PATENT DOCUMENTS 5,249,849 10/1993 Sakata ................. 303/190
5,586,815 12/1996 Negrin ................. 303/190 X

FOREIGN PATENT DOCUMENTS 35 36 185 4/1987 Germany .
36 37 594 5/1987 Germany .
37 33 661 4/1988 Germany .
39 10 483 10/1989 Germany .
4-163264 6/1992 Japan .

Primary Examiner—Lee W. Young
Attorney, Agent, or Firm—Foley & Lardner

[57] ABSTRACT

In an anti-skid control braking system for a four-wheel drive vehicle with a feature of determination of a road wheel drive state according to the present invention, a determination of an actual drive state of the four-wheel drive vehicle, namely, a determination of whether the four-wheel drive vehicle is running in a two-wheel drive state in which a driving force generated by an engine via a power transmission is distributed through a transfer only toward mainly driven road wheels (rear road wheel pair) or in a four-wheel drive state in which the driving force is distributed through the transfer toward the mainly driven road wheels and secondarily driven road wheels (front road wheel pair) at a predetermined distribution ratio is based on at least one of front and left road wheel speeds ($V_{WFL}$, $V_{WFR}$, and $V_{WR}$) which is detected for the rear road wheel pair without installation of a special-purpose switch (or sensor) especially used to detect the drive state of the four-wheel drive vehicle. In an embodiment, a variation rate ($V_{WR}'$) in the rear road wheel speed with respect to time is monitored to determine the actual road wheel drive state.

10 Claims, 16 Drawing Sheets

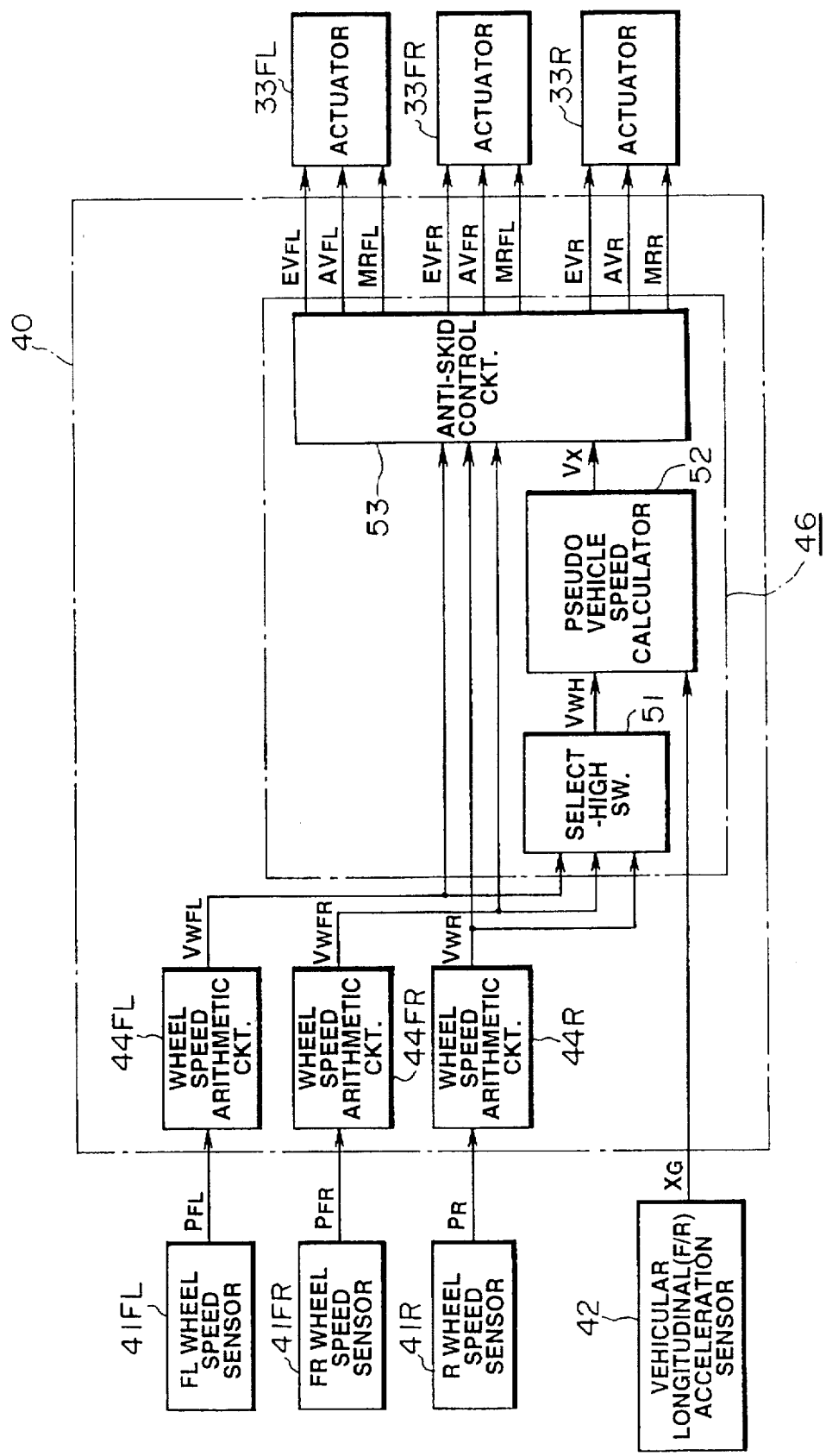

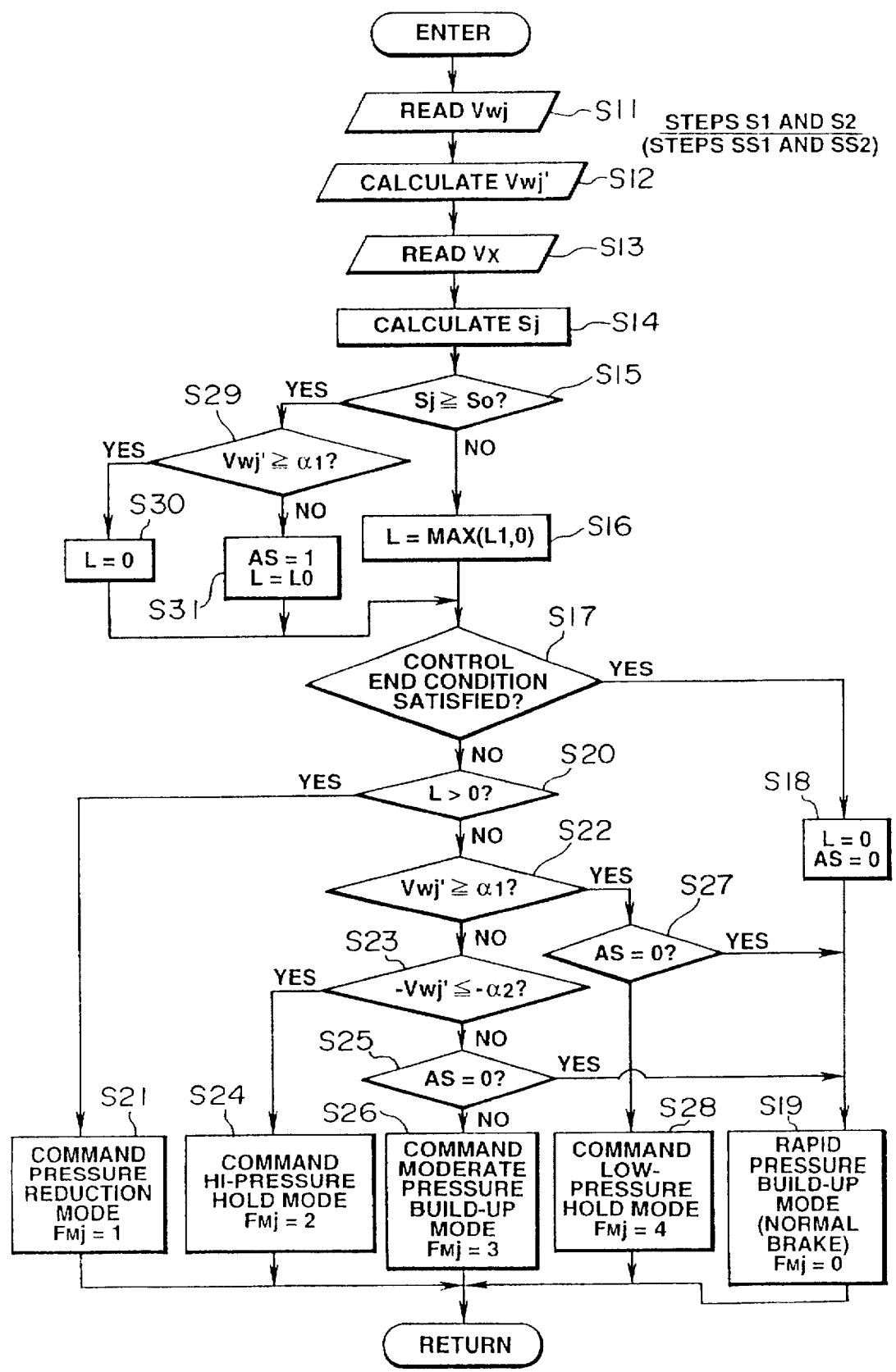

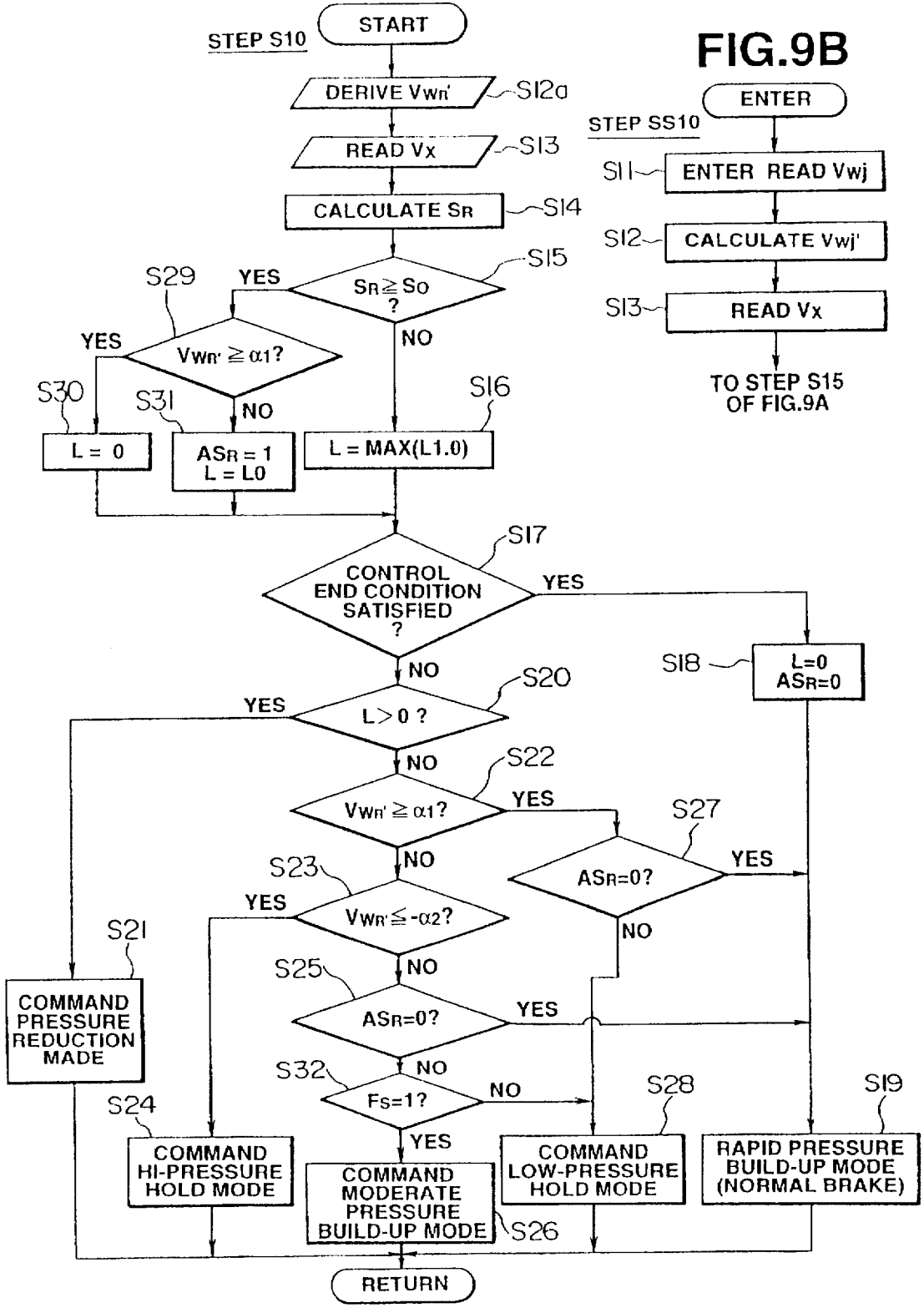

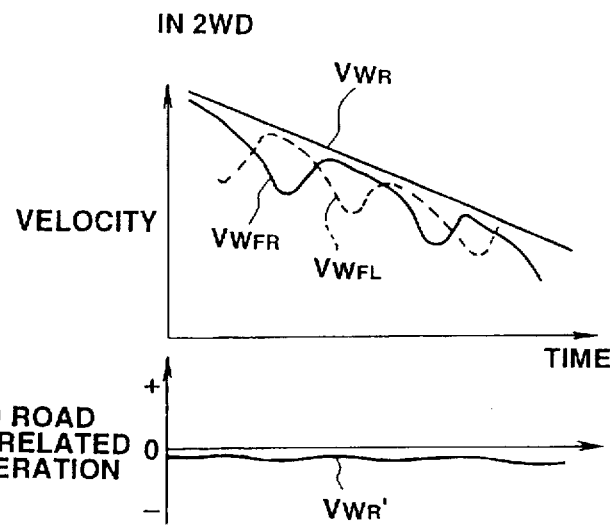
FIG.10A
FIG.10B
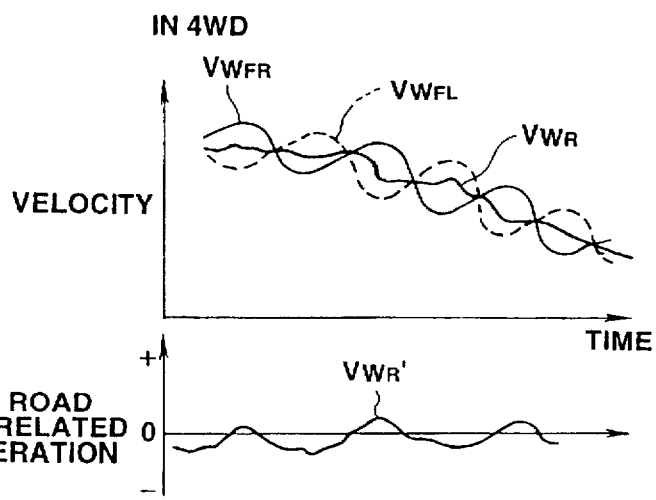
FIG.11A
FIG.11B

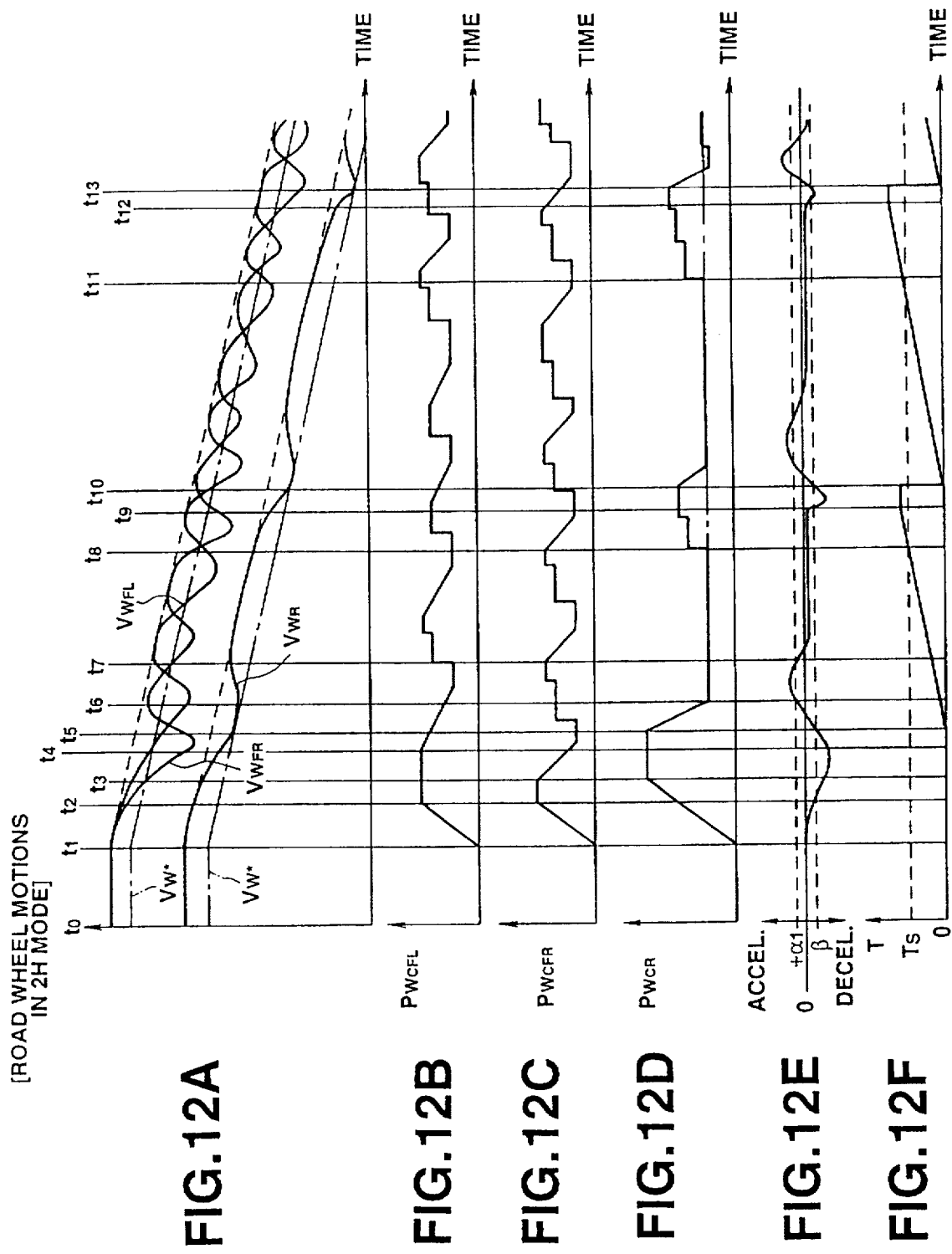

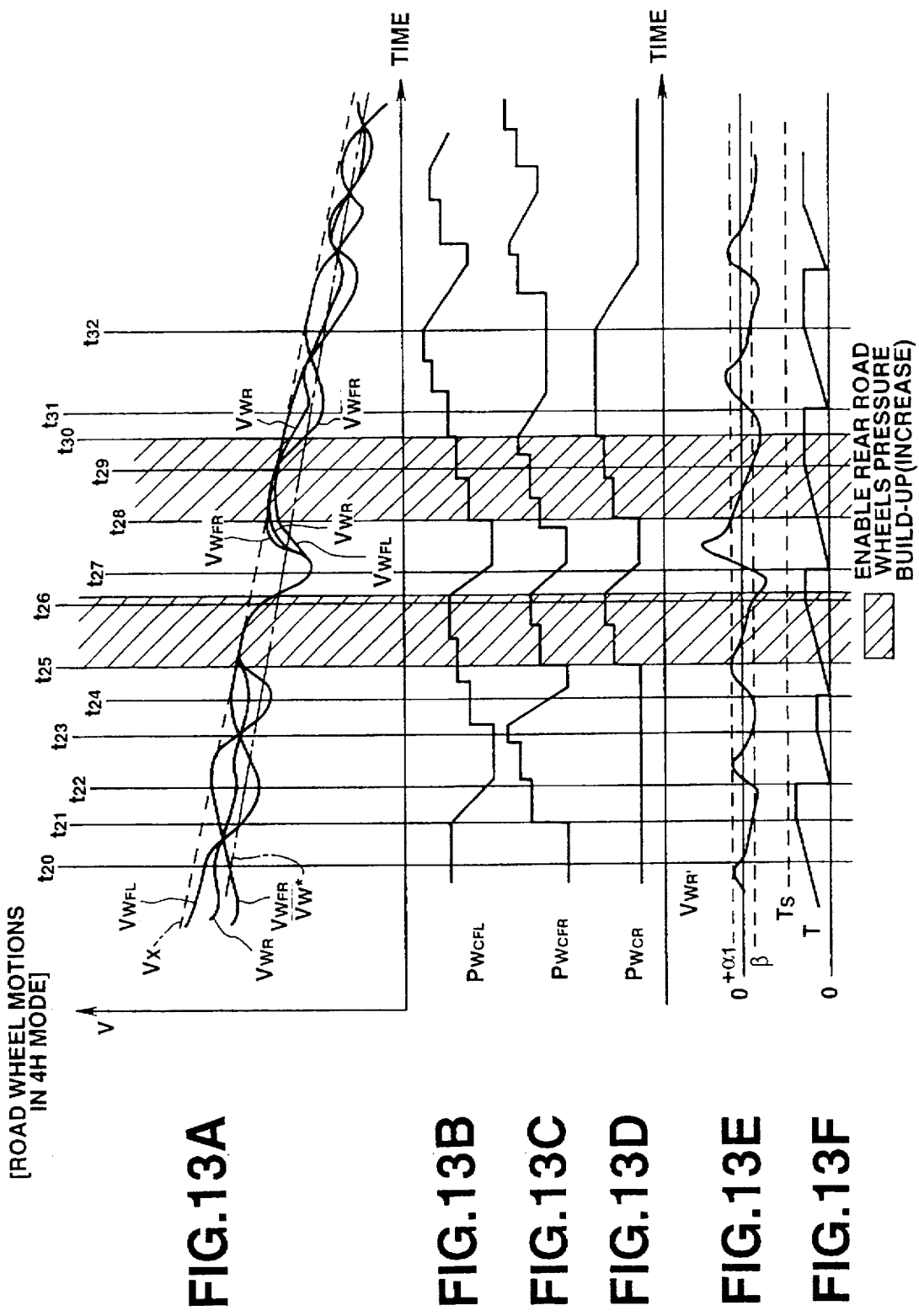

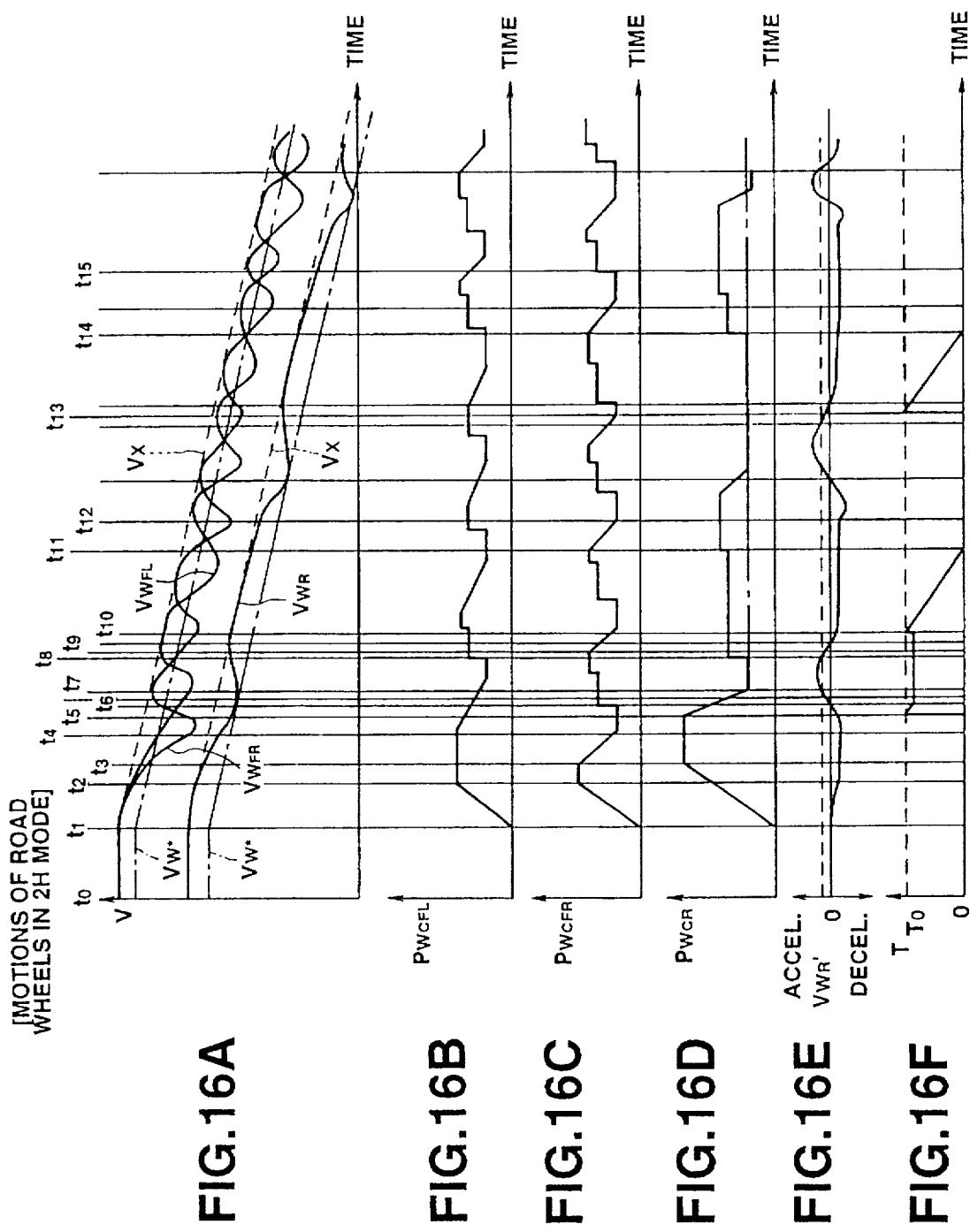

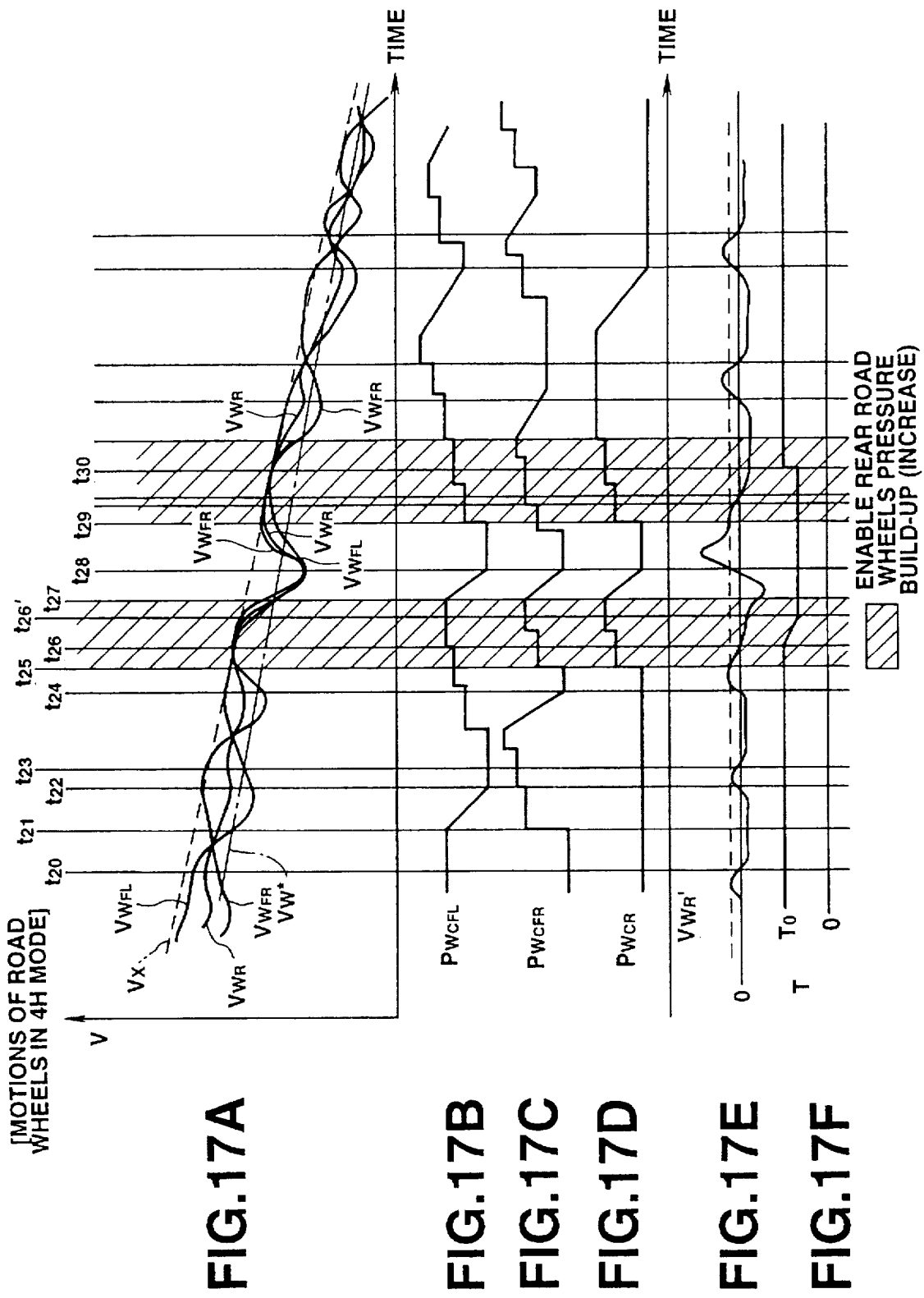

ANTI-SKID CONTROL BRAKING SYSTEM FOR FOUR-WHEEL DRIVE VEHICLE WITH FEATURE OF DETERMINATION OF DRIVE STATE

BACKGROUND OF THE INVENTION

1. Field of the Invention

The present invention relates to an anti-skid control braking system (also called an anti-skid brake control system (ABS)) for a four-wheel drive vehicle which can determine whether the four-wheel drive vehicle is running in a two-wheel or four-wheel drive state without an installation of a special-purpose detecting device or sensor especially used for detecting whether the four-wheel drive is running in the two-wheel or four-wheel drive state, the anti-skid control braking system having a transfer mechanism which is so arranged and constructed as to be selectable between the two-wheel drive state in which a driving force generated by a revolution source (engine) is distributed only toward mainly driven road wheels and the four-wheel drive state in which the driving force is distributed toward both of the mainly driven road wheels and secondarily driven road wheels at a predetermined distribution ratio and a braking pressure controller which is so arranged and constructed as to independently control braking pressures of braking cylinders installed on road wheels to be braking controlled on the basis of road wheel speed detection values of road wheel speed sensors used for detecting respective road wheel speeds (velocities) of at least two front left and right road wheels (secondarily driven road wheels) and at least one of rear road wheels (mainly driven road wheels) to be braking controlled.

2. Description of the Related Art

A previously proposed four-wheel drive vehicle having the anti-skid control braking system is exemplified by a Japanese Patent Application First Publication No. Heisei 4-163264 (published on Jun. 8, 1992).

The above-identified Japanese Patent Application First Publication discloses the previously proposed anti-skid control method and system as follows:

A 4WD (four-wheel drive) selection switch selectably switches between a two-wheel drive (2WD) state and a four-wheel drive (4WD) state.

In the two-wheel (2WD) state, a driving force generated by an engine installed in the four-wheel drive vehicle is transmitted only to front left and right road wheels (or rear left and right road wheels). In the (rigid) four-wheel drive (4WD) state, the driving force generated by the engine is transmitted to the front left and right road wheels via a power transmission, a front differential, and a front road wheel side drive shaft and to the rear left and right road wheels via the power transmission, a center differential, a propeller shaft, a rear differential, and a rear road wheel side drive shaft.

When the 2WD state is selected via the 4WD selection switch (or 2WD state is detected), braking pressures acted upon the front left and right road wheels and both of rear road wheels are independently controlled upon a start of the anti-skid control. When the 4WD state is selected via the 4WD selection switch (4WD state is detected) and the anti-skid control is started, both of the front road wheel side drive train (system) and rear road wheel side drive train (system) are interconnected. At this time, when braking forces exerted on the front road wheels and the rear road wheels are independently controlled, a torsional torque on the drive train (front road wheel and rear road wheel side drive trains) is increased so that road wheel speeds of the front road wheels and rear road wheels tend to be oscillated. Therefor, for example, when a tendency of lock on the rear right road wheel occurs so that both of the braking pressures on the rear left and right road wheels are reduced simultaneously in accordance with, so-called, select-low principle (selecting lower road wheel speed), the braking pressure on the front right road wheel located at the same longitudinal direction as the rear right road wheel) is also reduced simultaneously by a predetermined pressure so that pressure reduction controls of the braking pressures between each of the front road wheels and a correspondingly located rear road wheels are substantially in the same phase with each other, thus oscillations on the respective road wheel speeds being effectively suppressed.

However, since the anti-skid control is executed in mutually different modes of operation between the 2WD state and the 4WD state in the four-wheel drive vehicle having the anti-skid control braking system described above, it is necessary to determine whether the four-wheel drive vehicle is running in the two-wheel drive state or in the four-wheel drive state during the execution of the anti-skid control.

To determine the drive state of the four-wheel drive vehicle, a switch signal derived from the 4WD selection switch may be utilized. However, in this case, the 4WD selection switch functions only to issue a command to switch the drive state between the 2WD state and 4WD state and the switch signal does not function to detect an actual drive state.

Therefore, in order to detect that the transfer actually switches from the 2WD state to the 4WD state or vice versa, it is necessary by means of a special-purpose detecting switch or sensor to detect an engaged state of a free running wheel or a switched state in a switching mechanism within the transfer.

Hence, the special-purpose switch which is capable of detecting such the drive state as described above is required and its drive state detection signal is accordingly required. Hence, in this case, a reliability of parts of the detecting switch (or sensor) does not only need to be secured but also need to modify a hardware such as an addition of a circuit element used to detect a failure in the parts of the detecting switch (or sensor) and to add a fail-safe logic after a detection of the failure thereof. Consequently, a system reliability is accordingly reduced due to the increase in numbers of the parts and a total cost of the anti-skid control braking system with the above-described detecting switch (or sensor) is increased.

SUMMARY OF THE INVENTION

It is therefore an object of the present invention to provide anti-skid control braking system for a four-wheel drive vehicle which can accurately determine a two-wheel or four-wheel drive state of the four-wheel drive vehicle without an installation of a special-purpose detecting switch (or sensor) used specially to detect the drive state of the four-wheel drive vehicle and which can accordingly secure a system reliability and reduce a total cost of the whole system.

The above-described object can be achieved by providing an anti-skid control braking system for a four-wheel drive vehicle, said vehicle having mainly driven road wheels and secondarily driven road wheels, said anti-skid control braking system comprising:

a) a transfer mechanism which is so arranged and constructed as to be selectable between a two-wheel drive state in which a driving force passed from a power transmission is distributed therethrough only toward the mainly driven road wheels and a four-wheel drive state in which the driving force passed from the power transmission is distributed therethrough toward both of the mainly and secondarily driven road wheels at a predetermined distribution ratio;

b) a plurality of road wheel speed sensors which are so arranged and constructed as to detect road wheel speeds of at least two secondarily driven road wheels and one of the mainly driven road wheels, these road wheels braking controlled, and so as to produce respective road wheel speed signals indicative of the respectively detected road wheel speeds of the mainly and secondarily driven road wheels;

c) a plurality of braking cylinders disposed on the mainly and secondarily driven road wheels;

d) braking pressure controlling means for independently controlling braking pressures of the respective braking cylinders on the basis of values of the respective road wheel speed signals in an anti-skid control mode; and e) drive state determining means for determining whether the four-wheel drive vehicle is running in the two-wheel drive state or in the four-wheel drive state on the basis of the value of at least one of the respective road wheel speed signals of the one of the mainly driven road wheels.

The above-described object can also be achieved by providing a method for determining whether a four-wheel drive vehicle is running in a two-wheel drive state or in a four-wheel drive state, said four-wheel drive vehicle having mainly driven road wheel wheels, secondarily driven road wheels, and an anti-skid control braking system, the method comprising the steps of;

a) detecting road wheel speeds of at least two secondarily driven road wheels and at least one of the mainly driven road wheels, these road wheels braking controlled by means of the anti-skid control braking system;

b) controlling individually braking pressures of braking cylinders disposed on the mainly and secondarily driven road wheels by the anti-skid control braking system on the basis of values of the respective road wheel speeds in an anti-skid control mode; and c) determining whether the four-wheel drive vehicle is running in a two-wheel drive state in which a driving force passed from a power transmission of the four-wheel vehicle is distributed through a transfer only toward the mainly driven road wheels or in a four-wheel drive state in which the driving force passed from the power transmission is distributed toward both of the mainly and secondarily driven road wheels at a predetermined distribution ratio on the basis of a value of at least one of the respective road wheel speeds of the one of the mainly driven road wheels.

BRIEF DESCRIPTION OF THE DRAWINGS

FIG. 4 is a schematic circuit block diagram of a controller of the anti-skid control braking system shown in FIG. 1.

FIG. 8 is an operational flowchart of a front road wheel side anti-skid control process executed at steps S1 and S2 shown in FIG. 6.

FIG. 9A is an operational flowchart of a rear road wheel side anti-skid control process executed at a step S10 shown in FIG. 6.

FIG. 9B is a part of an operational flowchart of the rear road wheel side anti-skid control process executed at a step SS10 in a case of a second preferred embodiment of the anti-skid control braking system according to the present invention.

FIGS. 10A and 10B are explanatory views for explaining a variation in respective road wheel speeds of front and rear road wheels in a two-wheel drive state of the four-wheel drive vehicle shown in FIG. 1.

FIGS. 11A and 11B are explanatory views for explaining the variation in the respective road wheel speeds of the front and rear road wheels in a four-wheel drive state of the four-wheel drive vehicle shown in FIG. 1.

FIGS. 12A, 12B, 12C, 12D, 12E, and 12F are integrally a timing chart for explaining motions of the front and rear road wheels in the two-wheel drive state (2H mode) and for explaining the operation of the anti-skid control braking system in the first embodiment.

FIGS. 13A, 13B, 13C, 13D, 13E, and 13F are integrally a timing chart for explaining motions of the front and rear road wheels in the four-wheel drive state (4H mode) and for explaining the operation of the anti-skid control braking system in the first embodiment.

FIGS. 16A, 16B, 16C, 16D, 16E, and 16F are integrally a timing chart for explaining the motions of the front and rear road wheels in the two-wheel drive state (2H mode) in the case of the second preferred embodiment and for explaining the operation of the anti-skid control braking system in the second embodiment.

FIGS. 17A, 17B, 17C, 17D, 17E, and 17F are integrally a timing chart for explaining the motions of the front and rear road wheels in the four-wheel drive state in the case of the second preferred embodiment and for explaining the operation of the anti-skid control braking system in the second embodiment.

BEST MODE FOR CARRYING OUT THE INVENTION

Reference will hereinafter be made to the drawings in order to facilitate a better understanding of the present invention.

First Embodiment

Figure 1:
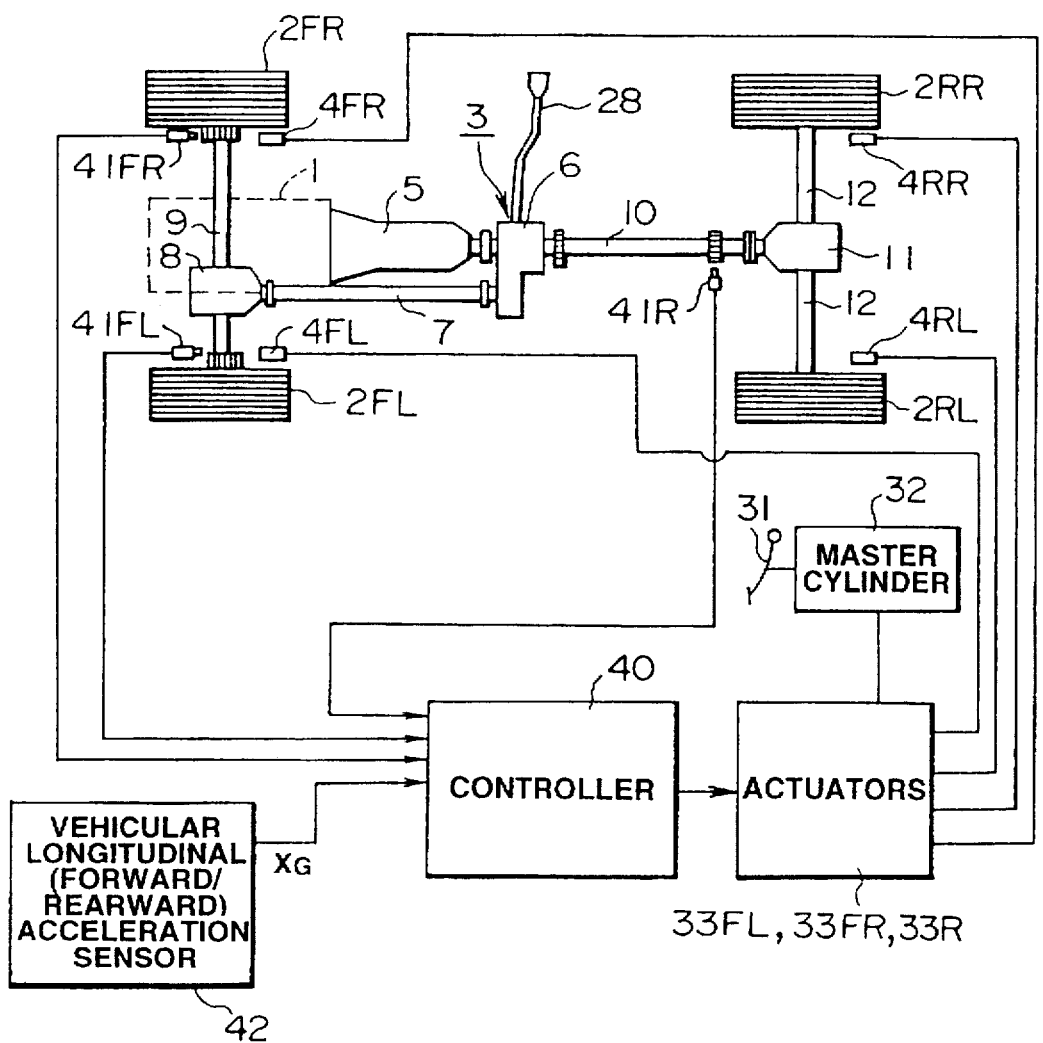
FIG. 1 is a schematic block diagram of an internal structure of a four-wheel drive vehicle to which an anti-skid control braking system in a first preferred embodiment according to the present invention is applicable.

FIG. 1 shows a schematic block diagram of a first preferred embodiment of an anti-skid control braking system applicable to a four-wheel drive vehicle.

In FIG. 1, an engine 1 as a rotation driving source is installed in the four-wheel drive vehicle having front road wheels 2FL and 2FR (2FL denotes a front left road wheel and 2FR denotes a front right road wheel) and rear road wheels 2RL and 2RR (2RL denotes a rear left road wheel and 2RR denotes a rear right road wheel).

In addition, a driving force transmission system generally denoted by 3 is connected to the engine 1 and is capable of modifying a driving force (power) distribution ratio toward the respective road wheels 2FL, 2FR, 2RL, and 2RR. Each wheel cylinder 4FL, 4FR, 4RL, and 4RR which serves as a braking cylinder is installed on a corresponding one of the respective road wheels 2FL, 2FR, 2RL, and 2RR.

The driving force transmission system 3 includes a power transmission 5 which carries out a gear shift (speed gear range) of the driving force transmitted from the engine 1 at a selected gear ratio and a transfer 6 which splits the driving force from the power transmission 5 into the driving forces (front road wheel side driving force and rear road wheel side driving force) toward the front road wheels 2FL and 2FR and rear road wheels 2RL and 2RR.

In the case of the four-wheel drive vehicle shown in FIG. 1, the rear road wheels 2RL and 2RR are mainly driven wheels and the front road wheels 2FL and 2FR are secondarily driven wheels.

The front road wheel side driving force split by means of the transfer 6 is transmitted to the front road wheels 2FL and 2FR via a front road wheel side output shaft 7, a front differential 8, and a front road wheel side drive shaft 9. On the other hand, the rear road wheel side driving force is transmitted to the rear road wheels 2RL and 2RR via a propeller shaft 10, a rear differential gear 11, and a rear road wheel side drive shaft 12.

Figure 2:
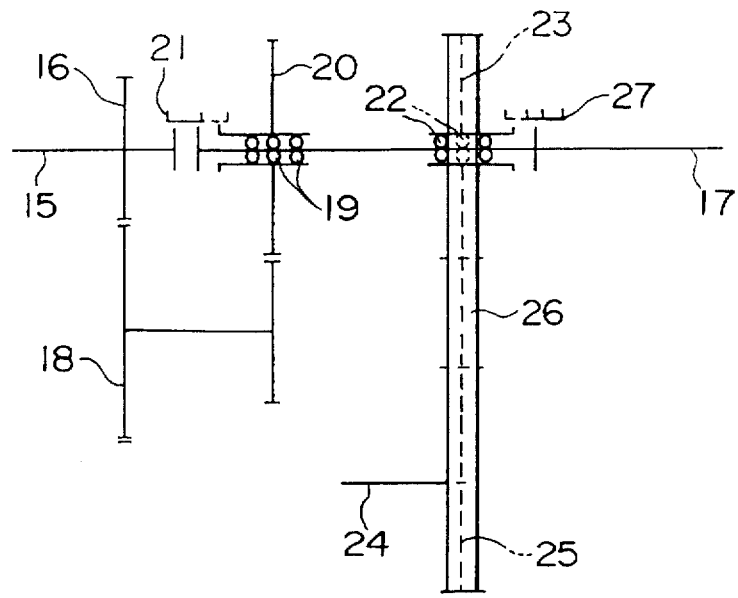
FIG. 2 is an explanatory skeleton view of an example of a transfer installed in the four-wheel drive vehicle shown in FIG. 1.

FIG. 2 shows a schematic structural view (in a skeleton) of the transfer 6 shown in FIG. 1.

The transfer 6 includes: an input shaft 15 coupled to an output shaft of the power transmission 5 (shown in FIG. 1); a main gear 16 coupled to the input shaft 15; a rear road wheel side output shaft 17 coupled to the propeller shaft 10 (shown in FIG. 1); a low gear 20 coupled to the main gear 16 via a counter gear 18 and rotatably disposed around the rear road wheel side output shaft 17 via a bearing 19; an L (low)-H (high) coupling sleeve 21 which selectively couples either the input shaft 15 or low gear 20 to the rear road wheel side output shaft 17; a drive chain 26 which is extended between a sprocket 25 formed on the front road wheel side output shaft 24 and a front road wheel side drive sprocket 23 which is rotatably disposed around the rear road wheel side output shaft 17 via a bearing 22; and 2 (two-wheel)-4 (four-wheel) coupling sleeve 27 which serves to disconnect between the front road wheel side drive sprocket 23 and rear road wheel side output shaft 17.

A transfer shift lever 28 (refer to FIG. 1) installed at a position of a vehicular compartment adjacent to a vehicle driver's seat is manually shifted to shift positions of both of the L-H coupling sleeve 21 and 2-4 coupling sleeve 27.

In details, when a 2H position is selected through the transfer shift lever 28, the L-H coupling sleeve 21 serves to directly couple the input shaft 15 to the rear road wheel side output shaft 17 and the 2-4 coupling sleeve 27 is placed at a position which is separate from the front road wheel side drive sprocket 23 so that the four-wheel drive vehicle is in a two-wheel (2H) drive state such that only the rear road wheels 2RL and 2RR are driven.

In addition, when a 4H position is selected through the transfer shift lever 28, only the 2-4 coupling sleeve 27 is coupled to the front road wheel side drive sprocket 23 with the L-H coupling sleeve 21 maintained to directly couple between the input shaft 15 and rear road wheel side output shaft 17 so that the four-wheel drive vehicle is in a, so-called, high-speed four-wheel (4H) drive state.

When an N (neutral) position is selected through the transfer shift lever 28, the L-H coupling sleeve 21 is separate from both of the input shaft 15 and low gear 20 with the L-H coupling sleeve 27 maintained to be coupled to the front road wheel side drive sprocket 23 so that the four-wheel drive vehicle is in a neutral (N) state.

When a 4L position is selected through the transfer shift lever 28, the L-H coupling sleeve 21 serves to couple the rear road wheel side output shaft 17 to the low gear 20 with the 2-4 coupling sleeve 27 maintained to be coupled to the front road wheel side drive sprocket 23 so that the four-wheel drive vehicle is in a, so-called, a low-speed four-wheel (4L) drive state.

Referring back to FIG. 1, a master cylinder 32 generates two-channel (front road wheel side and rear road wheel side) master cylinder hydraulic pressures in response to a depression angle of (depression force imposed on) a brake pedal 31. The master cylinder pressures from the master cylinder 32 are supplied individually to the front left and right road wheel side wheel cylinders 4FL and 4FR via front left and right road wheel side actuators 33FL and 33FR. The master cylinder pressure from the master cylinder 32 is supplied to the rear left and right road wheel side wheel cylinders 4RL and 4RR via a common rear road wheel side actuator 33R. Thus, the anti-skid control braking system as a whole is constituted in a, so-called, three-sensor-and-three-channel form (system configuration).

Figure 3:
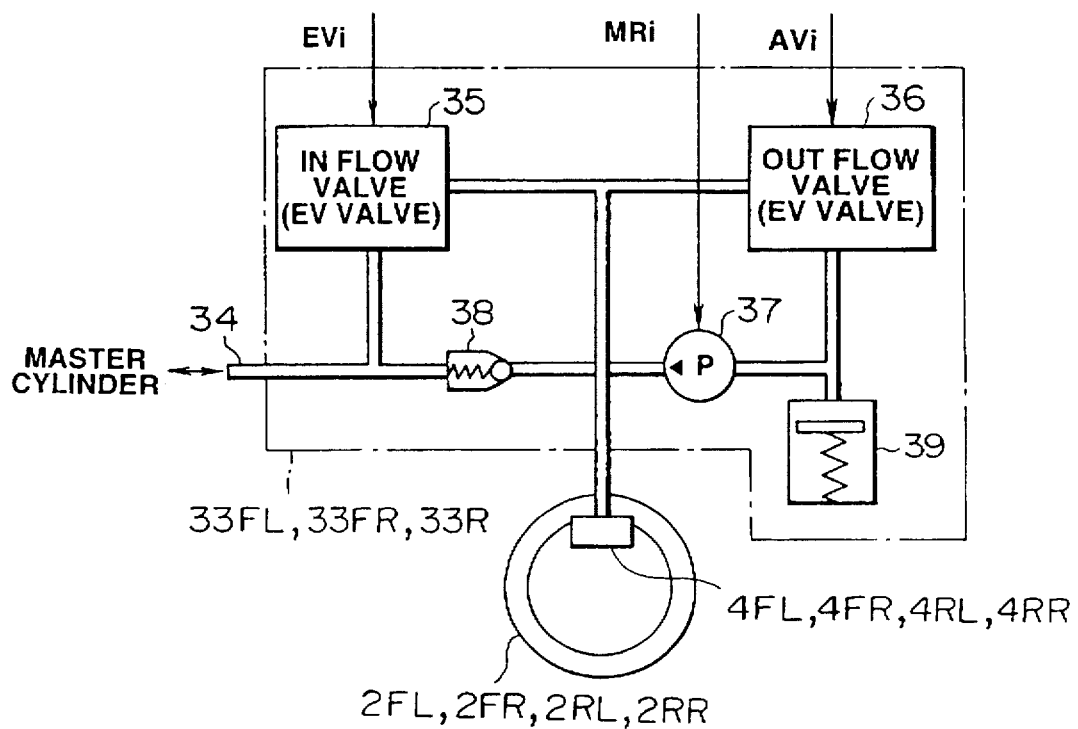
FIG. 3 is a schematic block diagram of a representative actuator installed in the anti-skid control braking stem shown in FIG. 1.

FIG. 3 shows an internal structure of each actuator 33FL, 33FR, and 33R.

That is to say, each actuator 33FL, 33FR, and 33R, as shown in FIG. 3, includes: a hydraulic (oil pressure) pipe 34 connected to the master cylinder 32; an electromagnetic inflow valve 35 interposed between the respectively corresponding one of the wheel cylinders 4FL, 4FR, 4RL, and 4RR and the master cylinder 32; an electromagnetic outflow valve 36 connected in parallel to the inflow valve 35; a series circuit having a hydraulic pump 37 and a check valve 38; and an accumulator 39 connected to a hydraulic pipe extended between the outflow valve 36 and hydraulic pump 37.

The inflow valve 35, outflow valve 36, and the hydraulic pump 37 of each actuator 33FL, 33FR, and 33R are controlled in response to a corresponding one of braking pressure control signals EV, AV, and MR derived from a controller 40 shown in FIG. 1. It is noted that a subscript i shown in FIG. 3 denotes any one of FL, FL, or R.

FIG. 4 shows a circuit block diagram of the controller 40 and its peripheral circuits shown in FIG. 1.

The controller 40 is connected to front road wheel side road wheel speed sensors 41FL and 41FR which output front road wheel speed pulse train signals $P_{FL}$ and $P_{FR}$ according to the front road wheel (front left and right road wheels) speeds of the front road wheels 2FL and 2FR; a rear road wheel speed sensor 41R which outputs rear road wheel speed pulse train signal $P_R$ of either of the rear left or right road wheels $2^{RL}$ or $2^{RR}$ according to a rotation speed of the propeller shaft 10; and a vehicular forward or rearward acceleration (longitudinal) acceleration (G: gravity) sensor 42 which detects the forward or rearward acceleration of the vehicle body. The controller 40 outputs the braking pressure control signals EV, AV, and MR to the respective actuators 33FL, 33FR, and 33R on the basis of detection signals of the respective road wheel speed sensors 41FL, 41FR, and 41R and the vehicular forward or rearward acceleration sensor 42.

In details, the controller 40, as shown in FIG. 4, includes: wheel speed arithmetic circuits 44FL, 44FR, 44R which receive the wheel speed pulse train signals $P_{FL}$, $P_{FR}$, and $P_R$ from the respective wheel speed sensors 41FL, 41FR, and 41R and calculate peripheral velocities (road wheel speeds) of the respective road wheels 2FL, 2FR, 2RL, and 2RR according to the received pulse train signals $P_{FL}$, $P_{FR}$, and $P_R$ and rotating radii of the respective road wheels 2FL, 2FR, 2RL, and 2RR; and an anti-skid controls block 46 which control the actuators 33FL, 33FR, and 33R on the basis of the road wheel speeds $V_{WFL}$, $V_{WFR}$, and $V_{WR}$ calculated by the respective wheel speed arithmetic circuits 44FL, 44FR, and 44R and the longitudinal (vehicular forward or rearward) acceleration $X_G$ derived from the vehicular forward or rearward (longitudinal) acceleration sensor 42.

The anti-skid control block 46 includes: a select-high switch (circuit) 51 which selects a highest road wheel speed (so-called, a select-high road wheel speed) $V_{WH}$ from among the input respective road wheel speeds $V_{WFL}$, $V_{WFR}$, and $V_{WR}$ derived from the road wheel speed arithmetic circuits 44FL, 44FR, and 44R; a pseudo (estimation) vehicle body speed calculator 52 which receives the select-high road wheel speed $V_{WH}$ selected by the select-high switch 51 and the vehicular forward or rearward acceleration $X_G$ derived from the vehicular forward or rearward acceleration sensor 42 and calculates a pseudo vehicle body speed $V_X$ corresponding to an actual vehicle body speed (velocity) on the basis of these input signals $V_{WH}$ and $X_G$; and an anti-skid control circuit 53 which controls the actuators 33FL, 33FR, and 33R on the basis of the pseudo vehicle body speed $V_X$ outputted from the pseudo vehicle body speed calculator 52 and the respective road wheel speeds $V_{WFL}$, $V_{WFR}$, and $V_{WR}$ of the respective road wheel speed arithmetic circuits 44FL, 44FR, and 44R. The anti-skid control circuit 53 corresponds to braking pressure controlling means.

Figure 5A:
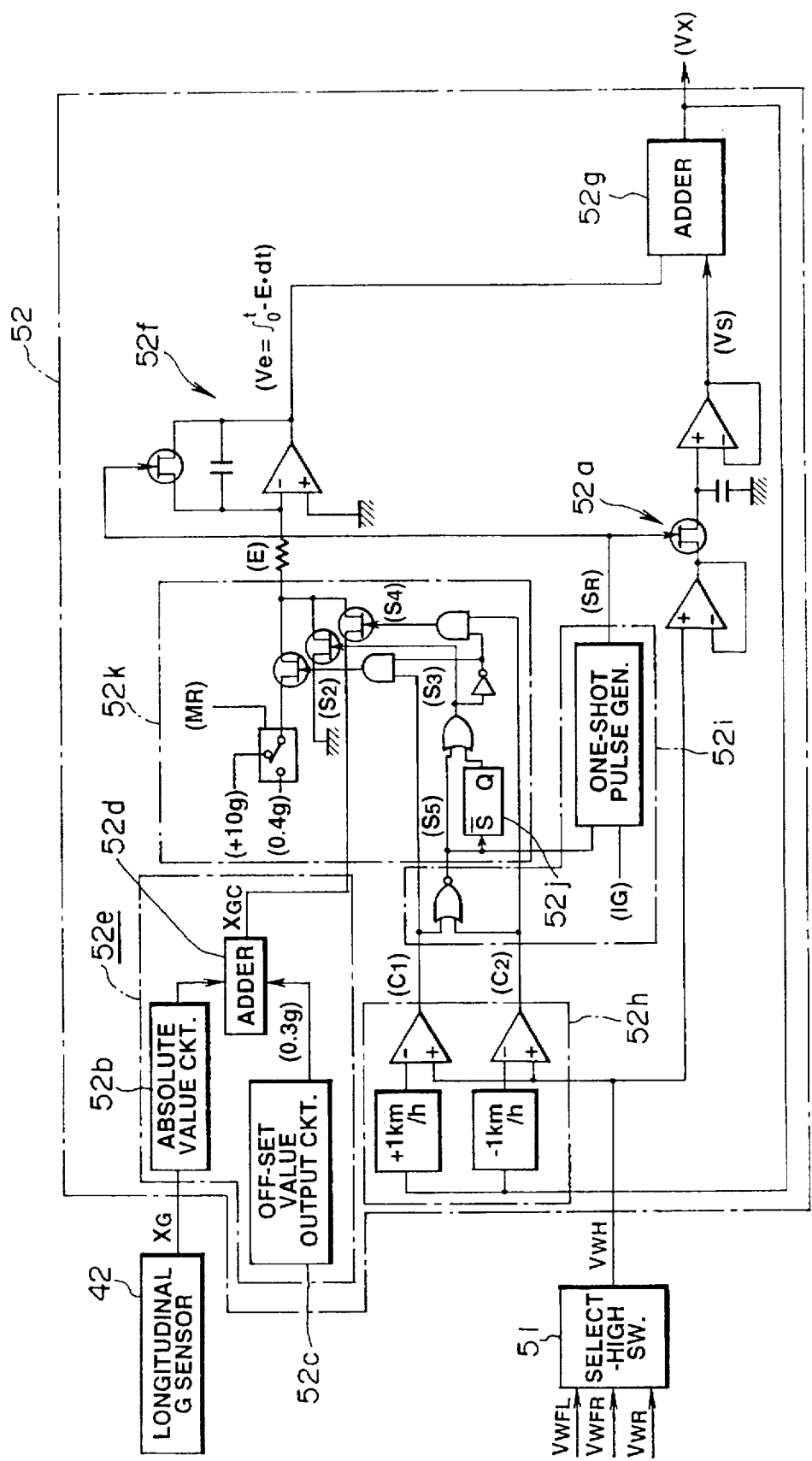
FIG. 5A is an exemplified circuit block diagram of a pseudo (estimation) vehicle body speed calculator shown in FIG. 4.

FIG. 5A shows an internal circuit structure of the pseudo vehicle body speed calculator 52.

The pseudo vehicle body speed calculator 52 includes: a sample hold circuit 52a; an absolute value circuit 52b; an off-set value output circuit 52c; an adder 52d; a sensor output correction circuit 52e; an integrator 52f; an adder 52g; a dead zone detector 52h; a reset circuit 52i; an off delay timer 52j; and a selector 52k.

The sample hold circuit 52a holds the select-high road wheel speed $V_{WH}$ selected by the select-high switch 51 as a road wheel speed sampled value $V_S$.

The absolute value circuit 52b calculates an absolute value of the vehicular forward or rearward detection value $X_G$ of the vehicular forward or rearward accelerator sensor 42.

The sensor output correction circuit 52e outputs a vehicular forward or rearward acceleration correction value $X_{GC}$ by adding the absolute value of the vehicular forward or rearward acceleration value |X $_G$| and an offset value corresponding to, for example, 0.3G, from the offset value output circuit 52c by means of the adder 52d.

The integrator 52f is provided with a capacitor, a MOS (metal Oxide Semiconductor) transistor, and an operational amplifier, serving to integrate an input voltage E, i.e., $V_e = \int -E \cdot dt$ (integration from t to 0).

The adder 52g adds the integrated output $V_e$ of the integrator 52f and the road wheel speed sampled value $V_S$ of the sample hold circuit 52a to derive the pseudo vehicle body speed $V_X$.

The dead zone detector 52h generally includes two comparators and reference signal generators generating reference voltages corresponding to +1 Km/h and −1 Km/h and detects whether the select-high road wheel speed $V_{WH}$ falls within a predetermined dead zone, namely, $V_X-1$ Km/h<$V_{WH}$<$V_X+1$ Km/h.

If $V_X-1$ Km/h<$V_{WH}$<$V_X+1$ Km/h, the dead zone detector 52h outputs two low level signals of $C_1$ and $C_2$. If $V_{WH} \geq V_X+1$ Km/h, the dead zone detector 52h outputs a high level signal of $C_1$ and the low level signal of $C_2$. If $V_{WH} \leq V_X-1$ Km/h, the dead zone detector 52h the high level signal of $C_2$ and the low level signal of $C_1$.

The reset circuit 52i generally includes a one-shot pulse generator and a NOR gate, renders the sample hold circuit 52a hold the select-high road wheel speed $V_{WH}$ and resets the integrator 52f when the dead zone detector 52h detects that the select-high road wheel speed $V_{WH}$ falls within the predetermined dead zone described above and when an ON signal IG on an engine ignition switch (not shown) is received.

The selector 52k generally includes the off delay timer 52j, OR gate, two AND gates, three MOS transistors, a switch, and a resistor.

The selector 52k supplies a zero voltage to the integrator 52f as the integration input voltage E when the select-high road wheel speed $V_{WH}$ falls within the predetermined dead zone and for a predetermined period of time $T_3$ set by the off delay timer 52j from a time at which the select-high road wheel speed $V_{WH}$ has fallen without the predetermined dead zone.

The selector 52k supplies a negative voltage corresponding to +0.4 G (G; gravity) during a non-anti-skid control and a negative voltage corresponding to +10 G during the anti-skid control, both being supplied to the integrator 52f as each integration input voltage E after the predetermined period of time $T_3$ has passed from a time at which an inequality such as $V_{WH} > V_X+1$ Km/h is satisfied.

Furthermore, the selector 52k supplies the vehicular forward or rearward acceleration correction value $X_{GC}$ derived from the sensor output correction circuit 52e to the integrator 52f as the integration input voltage E after the predetermined period of time $T_3$ has passed from a time at which an inequality such as $V_{WH} < V_X-1$ Km/h is satisfied.

Figure 5B:
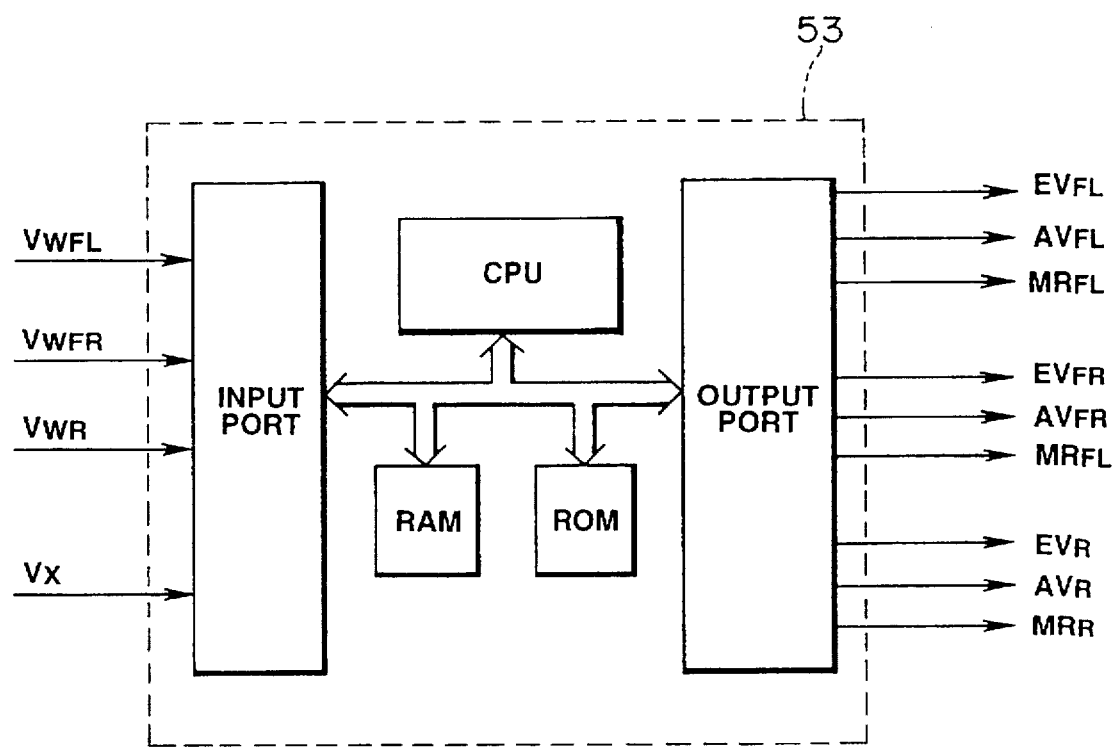
FIG. 5B is a schematic circuit block diagram of an anti-skid control circuit shown in FIG. 4.

FIG. 5B shows an internal structure of the anti-skid control circuit 53.

The anti-skid control circuit 53 controls the actuators 33FL, 33FR, and 33R controlling supply pressures to the wheel cylinders 4FL, 4FR, 4RL, and 4RR installed on the respective road wheels 2FL, 2FR, 2RL, and 2RR on the basis of the respective road wheel speeds $V_{WFL}$, $V_{WFR}$, and $V_{WR}$ and the pseudo vehicle body speed $V_X$ described above, outputting the logical signals of; $EV_{FL}$, $AV_{FL}$, and $MR_{FL}$ to the actuator 33FL; $EV_{FR}$, $AV_{FR}$, and $MR_{FR}$ to the actuator 33FR; and $EV_R$, $AV_R$, and $MR_R$ to the actuator 33R.

The anti-skid control circuit 53, as shown in FIG. 5B, includes a microcomputer having a CPU (Central Processing Unit), a ROM (Read Only Memory), a RAM (Random Access Memory, Input port, Output port, and a common bus.

Figure 6:
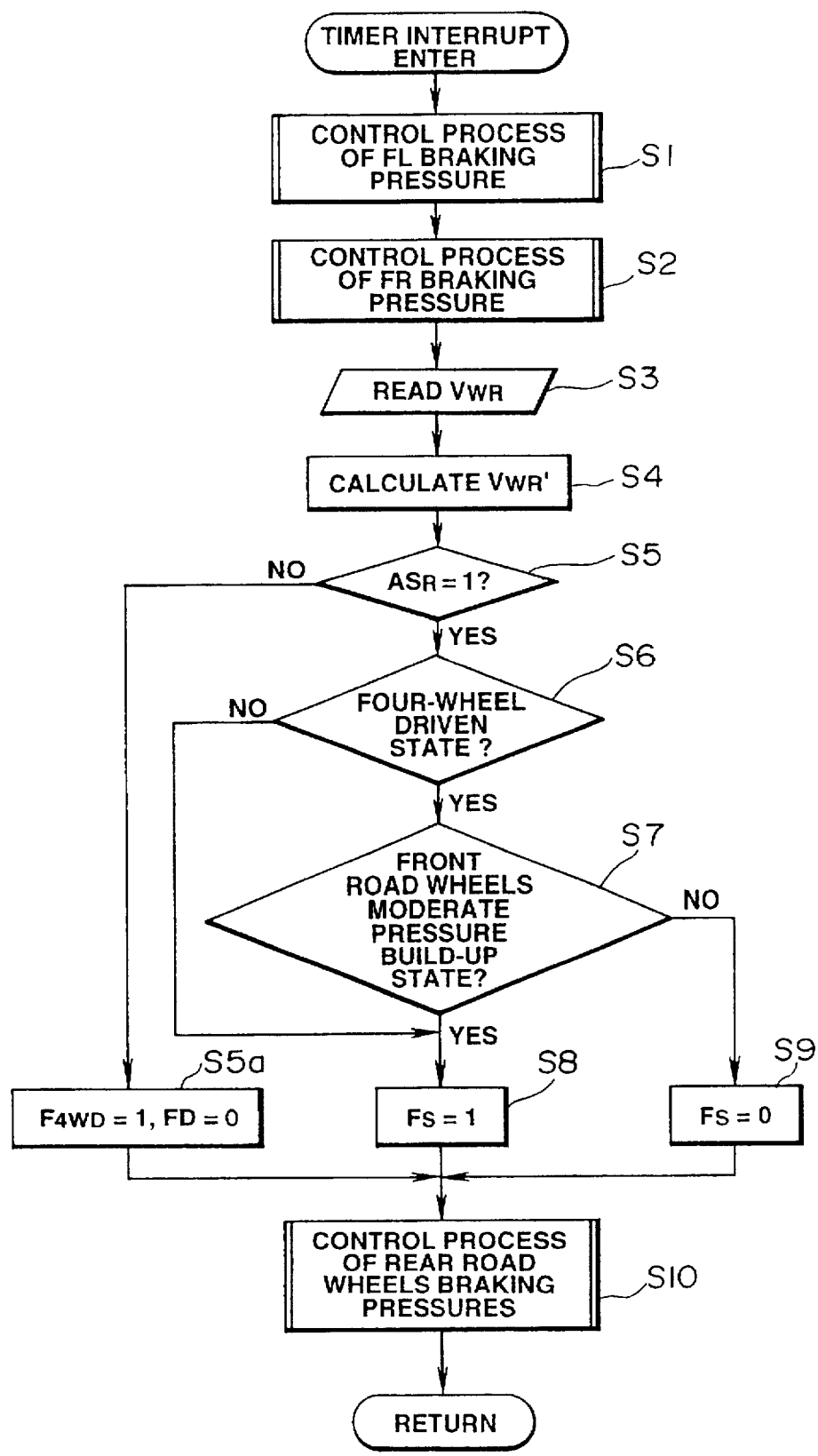
FIG. 6 is an operational flowchart of a control process executed in the anti-skid control circuit shown in FIG. 5B.
Figure 7:
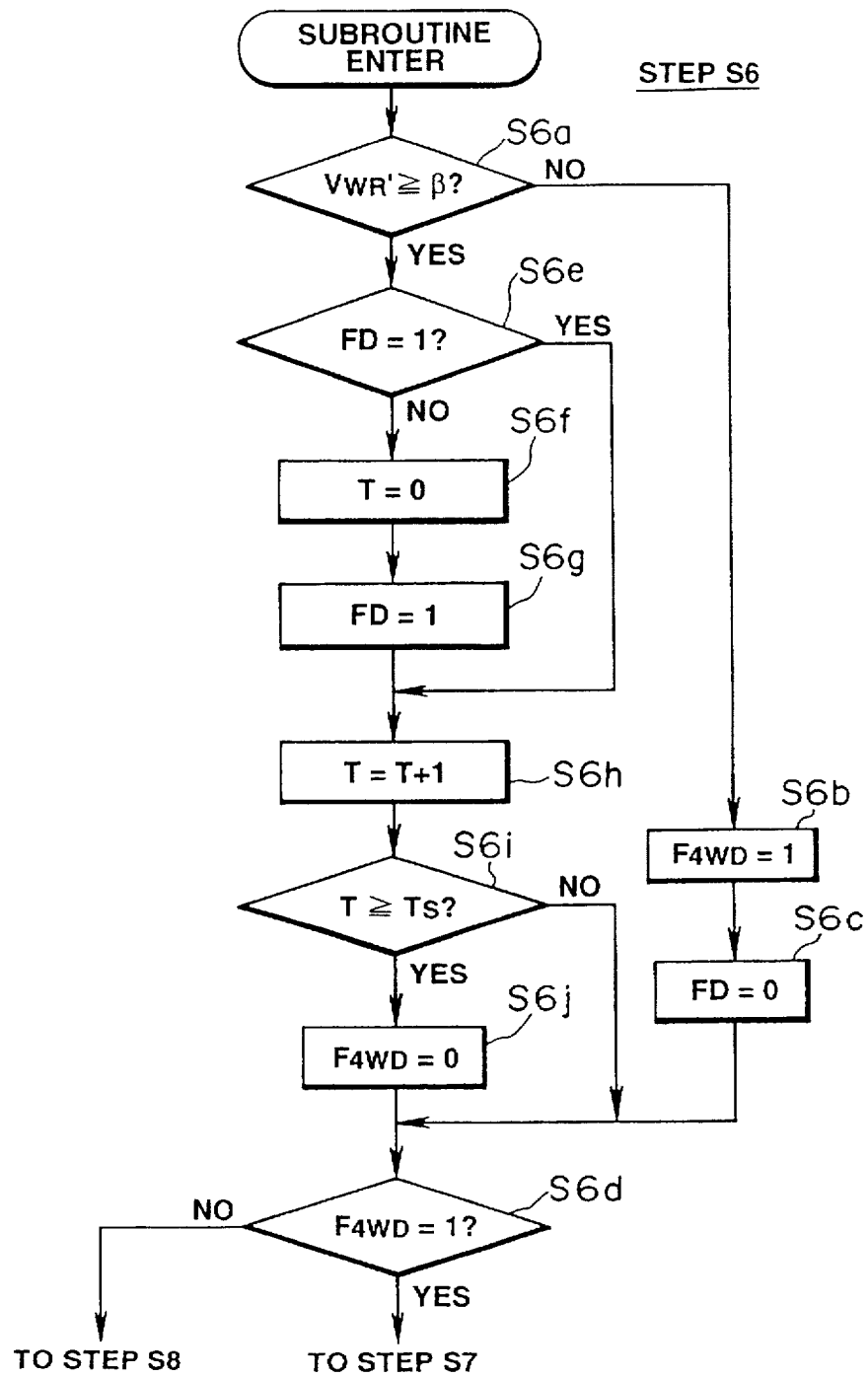
FIG. 7 is an operational flowchart of a subroutine executed at a step S6 shown in FIG. 6.

The anti-skid control circuit 53 executes a control process of braking force(s) shown in FIGS. 6 and 7.

FIG. 6 shows an interrupt braking force control processing routine executed for each predetermined time, for example, 10 milliseconds (msec.), responsive to a predetermined timer value (10 msec.).

First, at a step S1, the CPU of the anti-skid control circuit 53 executes an anti-skid control process (braking pressure control process) to the actuator 33FL for the front left road wheel 2FL.

At a step S2, the CPU executes the anti-skid control process to the actuator 33FR for the front right road wheel 2FR.

At a step S3, the CPU reads the rear road wheel speed $V_{WR(N)}$ (N=1, 2, 3, - - -).

At a step S4, the CPU subtracts the rear road wheel speed detection value $V_{WR(N)}$ read at the step S3 from the rear road wheel speed detection value $V_{WR(N-1)}$ read at a previously processed time and calculates a variation rate of the rear road wheel speed per unit of time, namely, a rear road wheel acceleration or deceleration $V_{WR}'$ by dividing the subtracted value by the interrupt period of time of the timer (10 msec.) to execute the flowchart of FIG. 6. The calculated rear road wheel acceleration or deceleration $V_{WR}'$ is stored in a predetermined memory area in the RAM of FIG. 5B.

Then, the routine goes to a step S5.

At the step S5, the CPU determines whether an anti-skid control flag AS (in this case, $AS_R$) for a rear road wheel side braking pressure control process is set to "1". If the anti-skid control flag AS (AS $_R$) is set to "0" (NO) at the steps S5, the CPU determines that the rear road wheel side anti-skid control is not started and the routine goes to a step S5a. At the step S5a, the CPU sets a drive state flag $F_{4WD}$ to "1" and resets a deceleration state flag FD to "0".

Then, the routine goes to a step S10 in which the rear road wheel side braking pressure control process is executed as will be described later.

If AS ($AS_R$) is set to "1" at the step S5 (YES), the routine goes to a step S6.

At the step S6, the CPU determines whether the variation rate of the rear road wheel acceleration or deceleration $V_{WR}'$ is relatively large so that the four-wheel drive vehicle is in the four-wheel drive state or is relatively small so that the vehicle is in the two-wheel drive state.

The determination of the drive state is, for example, to determine whether the rear road wheel acceleration or deceleration $V_{WR}'$ represents a repetition of such a state that the rear road wheels are accelerated, namely, the rear road wheel speed detection value $V_{WR}$ indicates an acceleration slip of each rear road wheel 2RL and 2RR. Specifically, the CPU determines whether such a state that the rear road wheel acceleration or deceleration $V_{WR}'$ calculated at the step S4 has exceeded a previously set drive state determination threshold value (criteria) β is continued for a predetermined period of time (as will be described later).

A reason (rationale) that the time variation of the rear road wheel acceleration or deceleration $V_{WR}'$ permits the determination of whether the four-wheel drive vehicle is running in the four-wheel drive state or in the two-wheel drive state will be described as follows:

That is to say, in the two-wheel drive state of the four-wheel drive vehicle, a moderate pressure build-up (increase) condition for the rear road wheel side is limited when both of the front left and right road wheels 2RL and 2RR are in pressure build-up states. At this time, when the four-wheel drive vehicle in which the anti-skid control braking system in the first embodiment is mounted is running on a low friction coefficient road such as a frozen road, snowy road, or rainy road, phases of the front left and right road wheel speed detection values of $V_{WFL}$ and $V_{WFR}$ are mutually shifted to (out of phase, deviated from) each other due to an influence of a friction of the front differential gear 8 on the front left and right road wheels 2RL and 2RR via the front road wheel side drive shaft 9, as shown in FIG. 10A, so that such a case that both of the front left and right road wheel speed detection values $V_{WFL}$ and $V_{WFR}$ are in the pressure build-up states hardly occurs. Consequently, the pressure build-up state for the rear road wheel side cannot accordingly be achieved and road wheel slips do not occur.

Hence, the rear road wheel acceleration or deceleration $V_{WR}'$ does not indicate the deceleration exceeding the vehicular deceleration, as shown in FIG. 10B, and provides a moderate motion of less variation rate.

On the other hand, in the (direct-coupled) four-wheel drive state, both of front and rear road wheels 2FL, 2FR, 2RL, and 2RR are in a dependency relationship and cannot move freely. Each of the four road wheels is moved synchronously (Each of the four wheel speeds is, so-called, a front left-and-right road wheel synchronized state in which the front left and right road wheel speeds $V_{WFL}$ and $V_{WFR}$ are synchronously oscillated with the rear road wheel speed $V_{WR}$ as a center when a road wheel directional resonance is generated due to a slight misalignment (play or offset) of the transfer 6. Or, as shown in FIG. 11A, the front left and right road wheel speeds $V_{WFL}$ and $V_{WFR}$ are varied in a mutually opposite phase relationship on the front left and right road wheels 2RL and 2RR and the rear road wheel (side) wheel speed detection value $V_{WR}$ indicates an average value of both of the front left and right road wheel speeds $V_{WFL}$ and $V_{WFR}$ (so-called, a front two wheel opposite phase state). However, as is different from the two-wheel drive state, a brake torque applied to the front road wheels 2FL and 2FR is acted upon the rear road wheels 2RR and 2RL via the propeller shaft 10 as a circular transmission torque so that the variation in the rear road wheel acceleration or deceleration $V_{WR}'$ on the rear road wheels 2RL and 2RR is relatively large as compared with the two-wheel drive state shown in FIG. 10B so that a state wherein the rear road wheel acceleration or deceleration $V_{WR}'$ falls in the acceleration state is repeated, as shown in FIG. 11B.

Hence, an accurate determination of whether the four-wheel drive vehicle is running in the four-wheel drive state or in the two-wheel drive state can be achieved by determining whether the variation rate, namely, the rear road wheel side road wheel acceleration or deceleration $V_{WR}'$ is relatively large or relatively small.

FIG. 7 shows a subroutine executed at the step S6.

In details, at a step S6a, the CPU determines whether the rear road wheel acceleration or deceleration $V_{WR}'$ is equal to or above a previously set drive state determination threshold value β (for example, −0.35 G corresponding to a predictable maximum value of the vehicular deceleration) or not.

If $V_{WR}'$<β (NO) at the step S6a, the variation rate of the rear road wheel acceleration or deceleration is so large that the CPU determines that the four-wheel drive vehicle is in the four-wheel drive state and the routine goes to a step S6b.

At the step S6b, the CPU sets the drive state flag $F_{4WD}$ to "1" indicating that the four-wheel drive vehicle is in the four-wheel drive state and the routine goes to a step S6c in which the deceleration flag FD representing the deceleration state is reset to "0". Then, the routine goes to a step S6d.

At the step S6d, the CPU determines whether the drive state flag $F_{4WD}$ used to determine whether the four-wheel drive vehicle is in the four-wheel drive state is set to "1". If $F_{4WD}$ is 1 ($F_{4WD}$=1) at the step S6d, the routine goes to the step S7. If $F_{4WD}$=0 at the step S6d, the routine goes to the step S8 shown in FIG. 6.

On the other hand, if $V_{WR}' \geq \beta$ at the step S6a, the routine goes to a step S6e in which the CPU determines whether the deceleration state flag FD is set to "1". If FD=1 (YES) at the step S6e, the routine jumps to a step S6h. If FD=0 (NO) at the step S6e, the routine goes to a step S6f in which a measuring timer T is cleared to "0". Then, the routine goes to a step S6g in which the deceleration flag FD is set to "1" and the routine goes to a step S6h.

At the step S6h, the measuring timer T is incremented by one (T=T +1) and the routine goes to a step S6i in which the CPU determines whether a counted value of the measuring timer T is equal to or above a predetermined drive state determination threshold value Ts (for example, correspond approximately to 250 msec.). If T≧Ts at the step S6i, the variation rate in the rear road wheel side acceleration or deceleration $V_{WR}'$ is less and the CPU determines that the four-wheel drive vehicle is in the two-wheel drive state and the routine goes to a step S6j. At the step S6j, the CPU resets the drive state flag $F_{4WD}$ to "0" and the routine goes to the step S6d. If T<Ts at the step S6i (NO), the routine jumps to the step S6d.

Referring back to FIG. 6, if, at the step S6, the CPU determines that the vehicle is in the four-wheel drive (driven) state (YES), the routine goes to a step S7. At the step S7, the CPU determines whether the anti-skid control modes for both of the front left and right road wheels 2FL and 2FR are either a moderate pressure built-up mode or in a hold mode at high pressure sides (high-pressure hold mode) (as will be described later) and, thus, mutually in pressure built-up states (increase). This determination is carried out by determining whether mode determination flags $F_{MFL}$ and $F_{MFR}$ at steps S24 and S26 shown in FIG. 8 are set to "2" or "3" in the anti-skid control process shown in FIG. 8. If both anti-skid control modes for the front road wheels 2FL and 2FR are in the pressure built-up states (increase) (YES) at the step S7, the routine goes to the step S8 in which a moderate pressure build-up (mode) enabling flag Fs enabling the moderate pressure increase for the rear road wheels 2RL and 2RR is set to "1" and the routine goes to the step S10. If the anti-skid control modes for the front road wheels 2FL and 2FR are not in the pressure increase (build-up) states (NO) at the step S7, the routine goes to a step S9 in which the CPU resets the moderate pressure built-up (increase) enabling flag Fs to "0" (Fs=0) and the routine goes to the step S10.

At the step S10, the CPU executes the anti-skid control process for the rear road wheels 2RL and 2RR, ends the timer interrupt processing shown in FIG. 6, and returns to a predetermined main program.

On the other hand, if the CPU determines that the four-wheel drive vehicle is in the two-wheel drive state at the step S6 (NO), the routine goes to the step S8 so as to omit (release) a moderate pressure built-up suppression process for the rear road wheel side. At this time, the moderate pressure built-up (increase) enabling flag $F_S$ is set to "1" at the step S8 and the routine goes to the step S10.

In addition, FIG. 8 shows the subroutine executed at the steps S1 and S2 shown in FIG. 6, namely, the front road wheel (side) anti-skid control processes.

At a step S11, the CPU reads the present road wheel speed detection value $V_{Wj (N)}$ outputted from the two front road wheel side road wheel arithmetic circuits 34j (j=FL and FR).

At a step S12, the CPU subtracts the present road wheel speed detection value $V_{Wj}'$ at the step S11 from the corresponding road wheel speed detection value $V_{Wj}$ previously read at the previous processing time, divides the subtracted value by the timer interrupt time (10 msec. described above) to calculate the road wheel speed variation rate per the unit of time, namely, the road wheel acceleration or deceleration $V_{Wj}'$, and stores the calculated road wheel acceleration or deceleration $V_{Wj}'$ into a predetermined memory area of the RAM of the anti-skid control circuit 53.

At a step S13, the CPU reads the pseudo vehicle body speed Vx from the pseudo vehicle body speed calculator 52.

At a step S14, the CPU calculates a slip rate of each road wheel denoted by Sj using the following equation (1).

$$Sj = \{(Vx - V_{Wj})/Vx\} \times 100 [\%]$$ (1)

At a step S15, the CPU determines whether the slip rate $S_j$ calculated at the step S14 is equal to or above a predetermined target slip rate So (for example, 20%).

If SJ<So at the step S15 (NO), the routine goes to a step S81. At the step S16, the CPU selects a larger one of either a value of the present pressure reduction timer L from which "1" is decremented or a value "0" as the value of the pressure reduction timer L (L=MAX (L1, 0)).

At a step S17, the CPU determines whether a predetermined control end condition is satisfied. For example, this determination is based on whether a brake switch signal derived from a brake switch (, e.g., disposed on the brake pedal 31 is in an off state (released) or whether the vehicle body speed indicates zero.

If the predetermined control end condition is satisfied at the step S17 (YES), the routine goes to a step S18. At the step S18, the CPU clears the pressure reduction timer L to "0" and resets the anti-skid control flag AS ($AS_F$) to "0". Then, the routine goes to a step S19.

At the step S19, the hydraulic pressure of the actuator 33j is set to a rapid pressure build-up mode such that the pressure of the actuator 33j accords with the pressure of the master cylinder 32, and the routine shown in FIG. 8 returns to the routine shown in FIG. 6.

In the rapid pressure build-up mode, at the step S19, both of the control signals EVj and AVj supplied to the actuator 33j are at the logical values of "0" so that the inflow valve 35 of the actuator 33j is open and the outflow valve 36 thereof is closed and the mode determination flag $F_{Mj}$ is set to "0" (j=FL or FR).

On the other hand, if the predetermined control end condition is not satisfied (NO) at the step S17, the routine goes to a step S20 in which the CPU determines whether the pressure reduction timer L is a positive value exceeding zero (L>0).

If L>0 (YES) at the step S20, the routine goes to a step S21 in which a pressure reduction mode is commanded and the routine returns to the control processing shown in FIG. 6.

The pressure reduction mode is such that the corresponding wheel cylinder 4j is pressure reduced. That is to say, in the pressure reduction mode, each control signal of EVj, AVj, and MRj is set to the logical value of "1" so that the inflow valve 35 of the actuator 33j is closed, the outflow valve 36 is open, the pressure held in the wheel cylinder 4j is returned to the master cylinder 32 via the outflow valve 36, the oil pressure pump 37, and the check valve 38.

Thus, the inner pressure of the wheel cylinder 4j is decreased and "1" is set to the mode determination flag $F_{Mj}$.

If the pressure reduction timer L is cleared to "0" as the result of determination of the step S20 (NO), the routine goes to a step S22.

At the step S22, the road wheel acceleration or deceleration $V_{Wj}'$ calculated at the step S12 is equal to or above a predetermined acceleration threshold value $+\alpha_1$. If $V_{wj}'<\alpha_1$ (NO) at the step S22, the routine goes to a step S23 in which the CPU determines whether the road wheel acceleration $V_{wj}'$ is equal to or below a predetermined deceleration threshold value $-\alpha_2$.

If $V_{wj}'\leq-\alpha_2$ at the step S23 (YES), the routine goes to a step S24.

At the step S24, the high-pressure hold mode is commanded such that the inner cylinder in the wheel cylinder $4j$ is held at a constant value and the routine is returned to the control process shown in FIG. 6.

In the high-pressure hold mode, the control signal EVj is set to the logical value of "1" and is supplied to the actuator $33j$ and the control signal AVj is set to the logical value of "0" and is supplied to the same actuator $33j$. Thus, the inflow valve 35 of the actuator $33j$ is closed and the outflow valve 36 thereof is closed so that the inner cylinder pressure of the wheel cylinder $4j$ is held at the pressure immediately before the supply of each logical value of the control signals EVj and AVj.

Then, at the step S24, "2" is set to the mode determination flag $F_{Mj}$.

On the other hand, if $V_{wj}'>-\alpha_2$ at the step S23 (NO), the routine goes to a step S25 in which the CPU determines whether the anti-skid control flag AS ($AS_F$) is reset to "0". If AS ($AS_F$)=0 at the step S25 (YES), the routine goes to the step S19.

If AS ($AS_F$)=1 (NO) at the step S25, the routine goes to a step S26.

At the step S26, the actuator $23j$ is set into the moderate pressure build-up mode in which the pressure in the wheel cylinder $4j$ is moderately increased (built-up) and the routine is returned to the control process shown in FIG. 6.

In the moderate pressure build-up mode, the control signal EVj supplied to the actuator $23j$ is continuously set to the logical value of "0" for a predetermined period of time, for example, 8 msec. and hereafter is switched into the logical value of "1" this switching being repeated for each predetermined period of time. In addition, with the inflow valve 35 of the actuator $33j$ intermittently open and the outflow valve 36 closed, the inner pressure of the wheel cylinder $4j$ is gradually increased in a stepwise manner and "3" is set to the mode determination flag $F_{Mj}$.

If $V_{wj}'\geq+\alpha_1$ at the step S22 (YES), the routine goes to a step S27 in which the CPU determines whether the anti-skid control flag AS ($AS_F$) is reset to "0".

If AS=0 (YES) at the step S27, the routine goes to the step S19 and if AS=1 (NO) at the step S27, the routine goes to a step S28.

At the step S28, the actuator $33j$ is set to a low-pressure hold mode such that the pressure of the wheel cylinder $4j$ is held under a low pressure at a value immediately before the entrance of this mode and the routine is returned to the control process shown in FIG. 6.

In the low-pressure hold mode, the control signal EVj is set to the logical value of "1" and is supplied to the actuator $33j$ and the control signal AVj is set to the logical value of "0" and is supplied to the actuator $33j$. Thus, the inflow valve 35 of the actuator $33j$ is closed and the outflow valve 36 is closed so that the inner pressure of the wheel cylinder $4j$ is held at the pressure immediately before the supply of each logical value of the control signals EVj and AVj and "4" is set as the mode determination flag $F_{Mj}$.

Furthermore, if $Sj\geq So$ at the step S15 (YES), the routine goes to a step S29.

At the step S29, the CPU determines whether the road wheel acceleration or deceleration $V_{wj}'$ is equal to or above the predetermined acceleration threshold value $+\alpha_1$.

If $V_{wj}'\geq+\alpha_1$ at the step S29 (YES), the routine goes to a step S30 in which the pressure reduction timer L is cleared to "0" and the routine goes to the step S17. If $V_{wj}'<+\alpha_1$ at the step S29 (NO), the routine goes to a step S31 in which the anti-skid control flag AS ($AS_F$) is set to "1" and the pressure reduction timer L is set to a positive predetermined value Lo and the routine goes to the step S17.

On the other hand, FIG. 9A shows a subroutine executed at the step S10 of FIG. 6.

Although the rear road wheel side anti-skid control process at the step S10, generally the same subroutine as that shown in FIG. 8, is executed, as shown in FIG. 9A, the processes at the steps S11 and S12 are omitted in FIG. 9A and a step S12a is inserted in place of the steps S11 and S12. That is to say, at the step S12a, the CPU reads the rear road wheel speed $V_{WR}$ from the rear road wheel speed arithmetic circuit 44R and calculates the rear road wheel side road wheel acceleration or deceleration $V_{WR}'$ calculated in the same way as the step S4 shown in FIG. 6. At the next step S13 of FIG. 9A, the CPU reads the pseudo vehicle body speed Vx from the pseudo body vehicle speed calculator 52 and, at the next step S14, the CPU calculates the slip rate for the rear road wheels $S_R$ in the same way as the step S14 shown in FIG. 8. It is noted that at the step S15 in FIG. 9A the CPU determines whether the slip rate $S_R$ is equal to or above the target slip rate So. In addition, a step S32 in which the CPU determines whether the moderate pressure build-up enabling flag $F_S$ (refer to FIG. 6) is set to "1" is inserted between the steps S25 and S26.

Only if $F_S=1$ (YES) at the step S32, the routine goes to the step S26 in which the moderate pressure build-up is set. If $F_S=0$ (NO) at the step S32, the routine goes to the step S28 in which the low-pressure hold mode is set.

It is noted that since the same series of processing as that shown in FIG. 8 is executed at the subroutine shown in FIG. 9A except no requirement of the settings of the mode determination flag $F_M$ at the steps S19, S21, S24, S26, and S28, the detailed explanations of the steps having the same step numbers as those shown in FIG. 8 are omitted herein in order to avoid a duplication of the explanations.

Next, FIGS. 12A through 12F show integrally a timing chart for explaining an operation of the anti-skid control braking system in the first embodiment.

Suppose that the transfer shift lever 28 is shifted to select the two-wheel drive state so that the 2-4 coupling sleeve 27 is interrupted between the rear road wheel side output shaft 17 and front drive sprocket 23 and the L-H coupling sleeve 21 links the main gear 16 and the rear road wheel side output shaft 17 so as to be placed at the high-speed position (this state is called in the 2H mode). In this state, the driving force derived from the power transmission 5 is transmitted to the rear road wheel side output shaft 17 via the input shaft 15 and L-H coupling sleeve 21, thus being transmitted to the rear left and right road wheels 2RL and 2RR via the propeller shaft 10. Consequently, the four-wheel drive vehicle shown in FIG. 1 is in the two-wheel drive state in which only the rear left and right road wheels 2RL and 2RR are driven road wheels.

Suppose now that, at a time $t_0$ shown in FIGS. 12A through 12F, the four-wheel vehicle cruises on a good road (good road means, for example, a paved road having a high frictional coefficient road surface) at a constant vehicle speed under a non-braking condition, in the above-described two-wheel drive state.

Since, in this running state, in the anti-skid control block 46, the value of the pseudo vehicle body speed Vx is coincident with each road wheel speed $V_{wi}$ (i=FL, FR, and R). each slip rate Si ($S_R$ in FIG. 9A) calculated at the step S14 shown in FIGS. 8 and 9A indicates zero. Since, at the time $t_0$, the four-wheel drive vehicle is under the non-braking condition (no brake pedal is depressed), each routine in FIGS. 8 and 9A are transferred from the step S15 to the step S16 and the pressure reduction timer L is cleared to zero at the previous processing time during the cruise run. The value of "0" is selected as the timer value of the pressure reduction timer L and each routine shown in FIG. 8 and FIG. 9A is transferred from the step S16 to the step S17.

At the step S17, the CPU determines that the vehicle is under the non-braking condition and the control end condition is satisfied. Then, each routine goes to the step S18 in which the pressure reduction timer L and the anti-skid control flag AS ($AS_F$ and $AS_R$) are cleared to zero and each routine goes to the step S19 in which the rapid pressure build-up mode is set.

In the rapid pressure build-up mode, each actuator 33$i$ serves to communicate the master cylinder 32 with each corresponding one of the wheel cylinders 4$i$ ($i$=FL, FR, RL, or RR). Since the four-wheel drive vehicle at the time $t_0$ is under the non-braking condition with no depression of the brake pedal, the pressure in the master cylinder 32 indicates approximately zero so that the pressure in the wheel cylinder 4$i$ is also maintained at approximately zero. Consequently, the four-wheel drive vehicle is maintained under the non-braking condition.

In the cruise running state described above, the pseudo vehicle body speed Vx of the pseudo vehicle body speed calculator 52 is approximately coincident with the select-high road wheel speed $V_{WH}$. At this time, the selector 52$k$ selects the integration input voltage having zero voltage so that the output voltage of the integrator 52$f$ indicates zero. At this time, the pseudo vehicle body speed Vx is approximately coincident with the actual vehicle body speed without variation in the pseudo vehicle body speed Vx.

Suppose that the brake pedal 31 is depressed so as to enter the braking condition at a time $t_1$ in the vehicular cruise state and under the non-braking condition.

At the time $t_1$, the master cylinder pressure of the master cylinder 32 is rapidly increased.

Since the rapid pressure build-up mode is set at this time $t_1$, the cylinder pressures $P_{WCFL}$ and $P_{WCFR}$ of the wheel cylinders 4FL and 4FR for the front road wheels 2FL and 2FR are rapidly increased to be equal to the master cylinder pressure, as shown in FIGS. 12B and 12C. In addition, the wheel cylinder pressure $P_{WCR}$ controlled by the actuator 23R for the rear road wheels 2RL and 2RR is rapidly increased to become equal to the master cylinder pressure, as shown in FIG. 12D.

In this way, since the cylinder pressures of the respective wheel cylinders 4FL, 4FR, 4RL, and 4RR are rapidly increased, the road wheel speeds $V_{WFL}$ and $V_{WFR}$ of the front left and right road wheels 2FL and 2FR which serve presently as non-driven road wheels are relatively rapidly decreased, as shown in FIG. 12A.

However, the rear road wheel side road wheel speed $V_{WR}$ of the rear left and right road wheels 2RL and 2RR which serve presently as the driven road wheels is moderately decreased since the rear left and right road wheels 2RL and 2RR receive an influence of an engine inertia and engine braking, as shown in FIG. 12A.

It is noted that in order to clarify a synchronized state of each road wheel, FIG. 13A depicts the front road wheel side road wheel speeds $V_{WFL}$ and $V_{WFR}$ and the rear road wheel side road wheel speed $V_{WR}$ separately from each other as mutually different road wheel speeds for convenience purposes.

In the braking state described above, the rear road wheel side road wheel speed $V_{WR}$ is selected as the select-high road wheel speed $V_{WH}$ up to a time $t_3$, as shown in FIG. 12A.

In the pseudo vehicle body speed calculator 52, the selector 52$k$ selects the vehicular forward or rearward acceleration correction value $X_{GC}$ as the integration input voltage E when a predetermined time $T_3$ set by the off delay timer 52$j$ is passed after the selected rear road wheel speed $V_{WR}$ is decreased by 1 Km/h with respect to the pseudo vehicle body speed Vx which is the road wheel speed sampled value Vs of the sample hold circuit 52$a$ before the time $t_1$. The vehicular forward or rearward acceleration correction value $X_{GC}$ selected by the selector 52$k$ is the correction value of the vehicular forward or rearward acceleration $X_G$ outputted from the output correction circuit 52$e$ added by the offset value. The integration input voltage E is integrated by the integrator 52$f$ and the integrated voltage Ve is supplied to the adder 52$g$ as a negative speed correction value.

Since the negative speed correction value added into the adder 52$g$ shown in FIG. 5A is subtracted from the road wheel speed sampled value Vs, the pseudo vehicle body speed Vx is reduced according to the reduction of the vehicle body speed.

Next, at a time $t_6$, the pseudo vehicle body speed Vx is approximately coincident with the front right road wheel speed $V_{WFR}$ selected as the select-high road wheel speed $V_{WR}$. Thus, the front right road wheel speed $V_{WFR}$ at this time is held as the road wheel speed sampled value Vs.

Thereafter, when the select-high road wheel speed $V_{WH}$ exceeds the dead zone and the predetermined period of time $T_3$ set by the off delay timer 52$j$ is passed, the anti-skid control is started. Since the control signal MR is turned to the logical value of "1", the negative voltage corresponding to +10G is inputted from the selector 52$k$ into the integrator 52$f$ as the integration input voltage E.

The pseudo vehicle body speed Vx is, then, rapidly increased so as to follow up the select-high road wheel speed $V_{WH}$. Thereafter, when the select-high road wheel speed $V_{WH}$ is reduced by 1 Km/h or lower than the pseudo vehicle body speed Vx, the pseudo vehicle body speed Vx is reduced in a form of a gradient which accords with the vehicular forward or rearward acceleration $X_G$.

In order to simplify the explanation, the pseudo vehicle speed Vx is reduced in a straight line (linear) manner as described above with reference to FIG. 12A. However, in an actual case, the pseudo vehicle body speed Vx is varied in a polygonal line manner as a function of the select-high road wheel speed $V_{WH}$ and the vehicular forward or rearward acceleration $X_G$.

On the other hand, if the road wheel acceleration or deceleration $V_{WFL}'$ and $V_{WFR}'$ on the front left and right road wheels 2FL and 2RR become equal to or below the deceleration threshold value $-\alpha_2$ at a time $t_2$, the routine is transferred to the step S24 via steps S11→S17, S20, S22, and S23 shown in FIG. 8 so that the high-pressure hold mode is set in the step S24 and both of the inflow valve 35 and the outflow valve 36 of the front road wheel side actuators 33FL and 33FR are closed. Consequently, the cylinder pressures of the front road wheel side wheel cylinders 4FL and 4FR fall in the hold state at the time $t_2$ as shown in FIGS. 12B and 12C.

Thereafter, at a time $t_3$, the road wheel slip rate $S_{FR}$ on the front right road wheel 2FR becomes equal to or below the target slip rate So and the front road wheel speed $V_{WFR}$ becomes equal to or below a target road wheel speed $V_w^*$ denoted by a dot-and-dash line of FIG. 13A and calculated by multiplying the pseudo vehicle body speed Vx by the corresponding target road wheel slip rate So.

At this time, when the control process shown in FIG. 8 is executed, the routine is transferred from the step S15 to the step S29. Since the front right road wheel acceleration or deceleration $V_{WFR}'$ is below the threshold value $+\alpha_1$ on the acceleration (NO) at the step S29, the routine is transferred to the step S31 in which the anti-skid control flag of AS is set to "1" and the pressure reduction timer L is set to the predetermined value of Lo (L=Lo). Hence, when the routine shown in FIG. 8 goes to the step S20, L>0 (YES). Then, the routine is transferred to the step S21 in which the pressure reduction mode is set.

At this time, the cylinder pressure $P_{WCFR}$ of the front right road wheel 2FR is rapidly decreased as shown in FIG. 12C and, thereafter, the cylinder pressure $P_{WCFR}$ thereof is in the low-pressure hold mode.

Then, at a time $t_4$, the road wheel speed $V_{WFL}$ on the front left road wheel 2FL is equal to or below the target road wheel speed $V_W^*$. The front left road wheel cylinder $P_{WCFL}$ is similarly in the pressure reduction mode and is rapidly decreased as shown in FIG. 12C. Thereafter, the front left road wheel cylinder $P_{WCFL}$ is in the low-pressure hold mode.

As described above, when the front left and right road wheel cylinder pressures $P_{WCFR}$ and $P_{WCFL}$ are pressure reduced, the braking forces applied to the front left and right road wheels 2FL and 2FR become reduced so that the front road wheel speeds $V_{WFL}$ and $V_{WFR}$ are turned from the decreasing tendency to the increasing tendency.

Anyway, during the time duration from the time $t_1$ through $t_4$, the rear road wheel acceleration or deceleration $V_{WR}'$ indicates the deceleration in the negative direction as shown in FIG. 12E.

Since, in the rear road wheel side braking force control process of FIG. 9A, the anti-skid control flag AS has been reset to "0" so that the routine shown in FIG. 6 is transferred from the step S5 to the step S5a and the drive state flag $F_{4WD}$ and the acceleration (deceleration) state flag FD are set to "1", respectively. Thus, the routine shown in FIG. B enters the step S10, i.e., the rear road wheel side braking force (pressure) control process.

When the rear road wheel acceleration or deceleration $V_{WR}'$ is equal to or below the threshold value $-\alpha_2$ on the deceleration at the time $t_3$, the routine shown in FIG. 9A is transferred from the step S23 to the step S24 and the high-pressure hold mode is set. Consequently, the wheel cylinder pressure $P_{WCR}$ at the rear road wheel side is held at a high value as shown in FIG. 12D.

Thus, the road wheel speed $V_{WR}$ on the rear road wheels 2RL and 2RR is moderately reduced as shown in FIG. 12A. Then, at the time $t_5$, the rear road wheel slip rate $S_R$ becomes equal to or above the target slip rate So and the rear road wheel speed $V_{WR}$ is reduced to become equal to or below the target road wheel speed $V_W^*$. At this time, when the control process shown in FIG. 9A is executed, the routine is transferred from the step S15 to the step S31 via the step S29 so that the anti-skid control flag AS ($AS_R$) is set to "1" and the pressure reduction timer L is preset to the predetermined value Lo. Then, the routine is transferred to the step S21 via the steps S17 and S20 so that the pressure reduction mode is set, thus the rear road wheel side wheel cylinder pressure $P_{WCR}$ at the rear road wheel side being rapidly reduced as shown in FIG. 12D.

As described above, at the time $t_5$, since the anti-skid control flag AS ($AS_R$) is set to "1" in the rear road wheel side braking pressure control process of FIG. 9A, the routine shown in FIG. 6 (braking force control process) is executed so as to be transferred from the step S5 to the step S6 in which the drive state determination process (shown in FIG. 7) is executed.

At the time $t_5$, since the rear road wheel side acceleration or deceleration $V_{WR}'$, in turn, indicates the deceleration in the positive direction positively exceeding the determination threshold value β on the drive state, as shown in FIG. 12E, the drive state flag $F_{4WD}$ is set to "1" at the step S5a at the previously executed routine (processing) of FIG. 7 and the deceleration start flag FD is reset to "0".

Thus, the routine shown in FIG. 7 is transferred to the step 6f in which the (time measuring) timer T is cleared to "0". Thus, the routine shown in FIG. 7 is transferred to the step 6f in which the (time measuring) timer T is cleared to "0". Next, the deceleration start flag FD is set to "1" and the routine shown in FIG. 7 is transferred to the step S6h in which the increment of the timer T is started. Since, at the step $t_5$, the count value of the timer T is below the set value Ts as shown in FIG. 13F, the routine is transferred to the step S6d. Since, in this state, the drive state flag $F_{4WD}$ is continued to be set to "1" the routine shown in FIG. 7 is transferred to the step S7. However, since, at the time $t_5$, the wheel cylinder pressure $P_{WCFL}$ on the front left road wheel 2FL is in the pressure reduction state and the wheel cylinder pressure $P_{WCFR}$ on the front right road wheel 2FR is in the low-pressure hold state, the routine shown in FIG. 6 is transferred to the step S9. At the step S9, the moderate pressure build-up mode enabling flag Fs is reset to "0" and the rear road wheel side braking pressure control process at the step S10 is executed.

However, since, in this state, the road wheel deceleration $V_{WR}'$ indicates negative and is smaller than the threshold value a $\alpha_1$ on the acceleration, the wheel cylinder pressure $P_{WCR}$ on the rear road wheels 2RL and 2RR continues in the pressure reduction state.

However, since, in this state, the road wheel deceleration $V_{WR}'$ still indicates negative and is smaller than the threshold value $\alpha_1$ on the acceleration, the wheel cylinder pressure $P_{WCR}$ on the rear left and right road wheels 2RL and 2RR continues in the pressure reduction state.

Thereafter, at a time $t_6$, the rear road wheel acceleration or deceleration $V_{WR}'$ is equal to or above the threshold value a $\alpha_1$ on the acceleration, as shown in FIG. 12F. At this time, when the control process of FIG. 9A is executed, the routine is transferred from the step S22 to the step S28. Then, the rear road wheel side actuator 33R is set in the low-pressure hold mode and the wheel cylinder pressure $P_{WCR}$ on each of the rear left and right road wheels 2RL and 2RR is held under the low-pressure as shown in FIG. 13D.

Thereafter, the actuator 33FL on the front left road wheel 2FL is in the moderate pressure build-up mode at a time $t_7$. At the time $t_7$, the actuator 33FR on the front right road wheel 2FR is in the pressure reduction mode. When the processing of FIG. 6 is executed, the routine shown in FIG. 6 is transferred from the step S7 to the step S9 in which the moderate pressure build-up (mode) enabling flag Fs is reset to "0" and the routine shown in FIG. 6 enters the step S10.

At the time $t_7$, the acceleration or deceleration $V_{WR}'$ on the rear road wheels is reduced below the threshold value $\alpha_1$ on the acceleration as shown in FIG. 12E.

At the time $t_7$, when the braking pressure control process of FIG. 9A is executed, the routine shown in FIG. 9A is transferred from the step S22 to the step S32 via the steps S23 and S25. Since the moderate pressure build-up (mode) enabling flag Fs is reset to "0", the routine shown in FIG. 9A is transferred to the step S28 in which the rear road wheel side actuator 33R is maintained in the low-pressure hold mode.

As described above, since the setting of the moderate pressure build-up (increase) mode is suppressed for the rear road wheel side actuator 33R, the road wheel speed $V_{WR}$ on the rear road wheels 2RL and 2RR is approximately coincident with the vehicle body speed Vx. Thus, the rear road wheel acceleration or deceleration $V_{WR}'$ continues a state positively exceeding the determination threshold value β on the drive state, as shown in FIG. 12E. Then, whenever the control process of FIG. 7 is executed, the count value of the timer T is incremented.

Thereafter, when the count value of the timer T becomes equal to or above the set value Ts at the time $t_8$ and the routine shown in FIG. 7 is executed, the four-wheel drive vehicle is determined to be in the two-wheel drive state and the routine shown in FIG. 7 is transferred from the step S6i to the step S6j in which the drive state flag $F_{4WD}$ is reset to "0".

Then, when the routine is transferred to the step S8 shown in FIG. 6, the moderate pressure build-up mode (increase) enabling flag Fs is set to "1".

At the time of $t_8$, the rear road wheel acceleration or deceleration $V_{WR}'$ is maintained below the threshold value a $\alpha_1$ on the acceleration. When the routine shown in FIG. 9A is executed, the routine is transferred from the step S32 via the steps S23 and S25. Since the moderate pressure build-up (increase) mode enabling flag Fs is set to "1", the routine goes to the step S26 in which the rear road wheel side actuator 33R is maintained in the moderate pressure build-up mode.

Therefore, the wheel cylinder pressure $P_{WCR}$ on each of the rear road wheels 2RL and 2RR is increased in the stepwise manner as shown in FIG. 12D and the rear road wheel speed $V_{WR}$ is started to be decreased as shown in FIG. 13A.

When, at a time $t_g$, the rear road wheel acceleration or deceleration $V_{WR}'$ is negatively reduced below the threshold value β on the drive state determination and when the routine shown in FIG. 7 is started to be executed, the CPU of the anti-skid control circuit 52 determines that the four-wheel drive vehicle is temporarily in the four-wheel drive state so that the routine shown in FIG. 7 is transferred from the step S6a to the step S6b in which the drive state flag $F_{4WD}$ is set to "1" and the speed reduction start flag FD is reset to "0". Thus, the routine from the steps S6b and S6c is transferred to the step S7. Thus, the rear road wheel side moderate pressure build-up suppression processing described above is restated.

Thereafter, at a time $t_{10}$, the rear road wheel speed $V_{WR}$ is reduced below the target road wheel speed $V_w'$ so that the rear road wheel side actuator 33R is set in the pressure reduction mode and the rear road wheel acceleration or deceleration $V_{WR}'$ positively exceeds the threshold value β on the drive state determination.

In the same way as the time $t_5$, the increment of the timer T is started.

Since the count value of the timer T exceeds the set value Ts at a time $t_{11}$, the CPU determines that the four-wheel drive vehicle is again in the two-wheel drive state so that the drive state flag $F_{4WD}$ is reset to "0".

Consequently, since the moderate pressure build-up suppression process for the rear road wheels is released, the wheel cylinder pressure $P_{WCR}$ on the rear road wheels is increased in the stepwise manner shown in FIG. 12D.

Thereafter, at a time $t_{12}$, the rear road wheel acceleration or deceleration $V_{WR}'$ is below the threshold value β on the drive state determination so that the CPU determines that the four-wheel drive vehicle is in the four-wheel drive state, the drive state flag $F_{4WD}$ is set to "1", and the moderate pressure build-up suppression process is executed.

Next, since, at a time $t_{13}$, the rear road wheel acceleration or deceleration $V_{WR}'$ positively exceeds the threshold value β on the drive state determination, the increment of the timer T is started.

It is noted that, as described above, when the CPU determines, at the step S5 of FIG. 6, that the four-wheel drive vehicle is now in the two-wheel drive state, the moderate pressure build-up (increase) suppression process for the rear road wheels 2RL and 2RR is released so that an opportunity of setting the pressure reduction mode for the rear road wheels 2RL and 2RR becomes increased and, thus, a braking distance during the anti-skid control operation can be shortened.

It is also noted that, in a case where, even in the two-wheel drive state, the setting of the moderate pressure build-up mode for the rear left and right road wheels is enabled only when each of both the front left and right road wheels 2FL and 2FR (actuators 33FL and 33FR) is in the moderate pressure build-up mode, it hardly occurs that both of the front left and right road wheels are mutually in the moderate pressure build-up modes since, as shown in FIG. 12A, the front left and right road wheel speeds $V_{WFL}$ and $V_{WFR}$ are varied in mutually opposite phases. Therefore, the rear road wheel side wheel cylinder $P_{WCR}$ for the rear road wheels 2RL and 2RR is held in the low pressure state, as shown in FIG. 12D, so that the rear road wheel speed $V_{WR}$ follows approximately the vehicle body speed, thus the braking distance being extended.

Next, suppose that when the transfer shift lever 28 is shifted to the 4 H position from the above-described two-wheel drive state, the 2-4 coupling sleeve 27 is linked to the front drive sprocket 23 so that the four-wheel drive vehicle is forced into the four-wheel drive state. At this time, the drive torque transmitted from the power transmission 5 to the input shaft 15 is transmitted to the rear road wheel side output shaft 17 and also transmitted to the front road wheel side output shaft 24 via the drive chain 26.

FIGS. 13A through 13F integrally show a timing chart for explaining the operation of the anti-skid control braking system in the first embodiment when the four-wheel drive vehicle is in the four-wheel drive state during the braking operation in the same way as described with reference to FIGS. 12A through 12F.

In details, in the four-wheel drive state, the road wheel speed $V_{WR}$ on the rear road wheels 2RL and 2RR indicates, as shown in FIG. 13A, the average value between the front left and right road wheels $V_{WFL}$ and $V_{WFR}$ since the rear road wheel speed $V_{WR}$ is the detection value of the rotation speed of the propeller shaft 10 shown in FIG. 1. In addition, the front left and right wheel speeds $V_{WFL}$ and $V_{WFR}$ tend to repeat alternatingly the increase and decrease in their speed values due to the influence of a friction or some factor of the front differential gear 11.

Hence, suppose now that, at a time $t_{20}$ of FIGS. 13A through 13F, the actuator 33FL of the front left road wheel 2FL is relatively in the high-pressure hold mode, the related wheel cylinder pressure $P_{WCFL}$ is under the relatively high pressure condition as shown in FIG. 13B, the actuator 33FR on the front right road wheel 2FR is in the low-pressure hold mode, and the related wheel cylinder pressure $P_{WCFR}$ is held in the relatively low pressure as shown in FIG. 13C. In addition, suppose that, at the time $t_{20}$, the anti-skid control is being executed, the rear road wheel side anti-skid control flag AS ($AS_R$) is set to "1", and the drive state flag $F_{4WD}$ is set to "1".

Since, at the time $t_{20}$, the rear road wheel acceleration or deceleration $V_{WR}'$ positively exceeds the determination threshold value β on the drive state, the increment of the timer T is continued when the routine shown in FIG. 7 is executed.

However, since, at the time $t_{20}$, the count value of the timer T is below the set value of Ts, the drive state flag $F_{4WD}$ remains at the value of "1" and the routine shown in FIG. 7 is transferred to the step S7 of FIG. 6 so that the moderate pressure build-up (increase) suppression processing for the rear road wheels is executed.

At this time, since, as described above, both of the actuators 33FL and 33FR are not in the moderate pressure build-up modes, the routine shown in FIG. 6 is transferred to the step S9 in which the moderate pressure build-up (mode) enabling flag Fs is reset to "0" and the routine shown in FIG. 6 is transferred to the step S10 in which the rear road wheel side braking pressure control process is executed.

At the step S10 (refer to FIG. 9A), the rear road wheel speed $V_{WR}$ tends to be reduced, the rear road heel side slip rate $S_R$ is below the target slip rate So, the value of $V_{WR}$ is larger than the target road wheel speed $V_W^*$, the road wheel acceleration or deceleration $V_{WR}'$ is below the threshold value a $α_1$ on the acceleration and is equal to or above the threshold value $-α_2$ on the deceleration. Thus, the routine shown in FIG. 9A is transferred from the step S15 to the step S32 via the steps S16, S17, S20, S22, S23, and S25. At the step S32, the moderate pressure build-up (mode) enabling flag Fs is reset to "0". Then, the routine is transferred from the step S32 to the step S28 without the setting of the moderate pressure build-up mode. Then, the rear road wheel side actuator 33R is maintained in the low-pressure hold mode.

Thus, the wheel cylinder pressure $P_{WCR}$ on the rear road wheels 2RL and 2RR is held in the relatively low pressure as shown in FIG. 13D.

Thereafter, at a time $t_{21}$, if the rear road wheel side road wheel acceleration or deceleration $V_{WR}'$ negatively exceeds the determination threshold value β on the drive state as shown in FIG. 13A, the CPU of the anti-skid control circuit 53 immediately determines that the four-wheel drive vehicle is in the four-wheel drive state and the drive state flag $F_{4WD}$ is set to "1" at the step S6b of FIG. 7.

It is noted that, at the time $t_{21}$, the actuator 33FL of the front left road wheel 2FL is set in the pressure reduction mode, the related wheel cylinder pressure $P_{WCFL}$ is rapidly reduced, the actuator 33FR of the front right road wheel 2FR is in the moderate pressure build-up mode, and the related wheel cylinder pressure $P_{WCFR}$ becomes the moderate pressure build-up state in the stepwise manner as shown in FIG. 13C. However, since both of the front left and right road wheel actuators 33FL and 33FR are not in the moderate pressure build-up modes, the rear road wheel side actuator 33R maintains the low-pressure hold mode.

Then, at a time $t_{22}$, since the rear road wheel side acceleration or deceleration $V_{WR}'$ positively exceeds the determination threshold value β on the drive state, the increment of the timer T is started. However, since, at a time $t_{23}$ before which the count value of the timer T reaches the set value Ts, the rear road wheel acceleration or deceleration $V_{WR}'$ negatively exceeds the determination threshold value β on the drive state, the increment of the timer T is halted and the drive state flag $F_{4WD}$ is set to "1" (at the step S6b).

Thereafter, in the same way as described at the time $t_{22}$, the increment of the timer T is started at times $t_{24}$, $t_{27}$, $t_{31}$ - - - and, in the same way as described at the time $t_{23}$, the increment of the timer T is halted and the drive state flag $F_{4WD}$ is set to "1" at times $t_{26}$, $t_{29}$, $t_{32}$, - - - before which the count value of the timer T reaches the set value Ts since the rear road wheel acceleration or deceleration $V_{WR}'$ negatively exceeds the determination threshold value β on the drive state. These operations are repeated.

On the other hand, at a time $t_{25}$, the front right road wheel actuator 33FR on the front right road wheel actuator 33FR on the front right road wheel 2FR is in the moderate pressure build-up mode so that both front road wheel actuators 33FL and 33FR are in the moderate pressure build-up modes. At this time, when the routine shown in FIG. 6 is executed, the routine shown in FIG. 6 is transferred from the step S7 to the step S8 in which the moderate pressure build-up mode enabling flag Fs is set to "1" and the routine shown in FIG. 6 enters the step S10 of the rear road wheel side braking pressure control process.

At this time, since the rear road wheel acceleration or deceleration $V_{WR}'$ is below the threshold value a $α_1$ on the acceleration as shown in FIG. 13E, the routine shown in FIG. 9A is transferred to the step S32 via the steps S22, S23, and S25. Since the moderate pressure build-up (increase) enabling flag Fs is set to "1", the routine shown in FIG. 9A is transferred to the step S26.

At the step S26, the rear road wheel (side) actuator 33R is set in the moderate pressure build-up mode and the wheel cylinder pressure $P_{WCR}$ for the rear road wheels 2RL and 2RR is largely increased in the stepwise manner as shown in FIG. 13D. Consequently, the braking forces applied to the rear road wheels 2RL and 2RR are enlarged so that the rear road wheel side speed $V_{WR}$ is decreased.

Thereafter, at a time $t_{27}$, since the rear road wheel (side) (road wheel) speed $V_{WR}$ is below the target road wheel speed $V_W^*$, the rear road wheel side actuator 33R is set in the pressure reduction mode and thereafter is transferred in the low-pressure hold mode.

At a time $t_{28}$, since both of the actuators 33FL and 33FR for the front left and right road wheels 2FL and 2FR are in the moderate pressure build-up (increase) modes, the rear road wheel (side) actuator 33R is set in the moderate pressure build-up (increase) mode.

In general, when, in the four-wheel drive state, the front left and right road wheels 2FL and 2FR are in the braking pressure reduction states and under the acceleration slip condition, the braking forces are acted upon the rear left and right road wheels 2RL and 2RR with the rear road wheel side in the moderate pressure build-up state. The braking forces, at this time, are transmitted to the front left and right road wheels 2FL and 2FR via the propeller shaft 10, the 2-4 coupling sleeve 27, the chain 26, and front road wheel side output shaft 24. Thus, each value of the front road wheel speeds $V_{WFL}$ and $V_{WFR}$ on the front left and right road wheels $V_{WFL}$ and $V_{WFR}$ is slowly decreased (retardation of a recovery of the respective front road wheel speeds toward the vehicle body speed) and/or follows below the vehicle body speed so that advantages of the use of the anti-skid cannot effectively be exhibited.

However, in the first embodiment of the anti-skid control braking system, when the four-wheel drive state is determined, the anti-skid control braking system inhibits the actuator 33R on the rear left and right road wheels 2RL and 2RR from being set in the moderate pressure build-up mode except that the front road actuators 33FL and 33FR are both in the moderate pressure build-up modes.

Therefore, the recovery of the front left and right road wheel speeds 2FL and 2FR can effectively be carried out and the following of the front left and right road wheel speeds 2FL and 2FR below the vehicle body speed can assuredly be prevented from occurring. Consequently, the advantages of the anti-skid control can effectively be exhibited.

As described above, in the first embodiment, the rear road wheel acceleration or deceleration $V_{WR}'$ is monitored so that an accurate determination of whether the four-wheel drive vehicle shown in FIG. 1 is running in the two-wheel drive state or in the four-wheel drive state can be made without special installation of the special-purpose drive state switch (or sensor). Then, according to the determined drive state, an optimum braking pressure control process can be executed.

In addition, since, when the four-wheel drive vehicle is determined to be running in the two-wheel drive state, the moderate pressure build-up suppression process on the rear road wheel side in the four-wheel drive state is released, the opportunity of settings of the pressure reduction modes on the rear-road wheel side is increased in the two-wheel drive state, thus the braking distance can be shortened during the anti-skid control operation.

It is noted that, when the shift lever 28 of the transfer 6 shown in FIG. 1 is shifted to a 4L position, the L-H coupling sleeve 21 couples the low gear 20 to the rear road wheel side output shaft 17.

Thus, both of the front left and right road wheels 2FL and 2FR and the rear left and right road wheels 2RL and 2RR are driven in a low speed range under the four-wheel drive condition (4L mode). In this case, the optimum braking pressure control process can also be achieved in the same way as described with reference to FIGS. 13A through 13F.

In the first embodiment, the CPU of the anti-skid control circuit 53 determines that the four-wheel drive vehicle is running in the two-wheel drive state when the rear road wheel acceleration or deceleration $V_{WR}'$ which positively exceeds the determination threshold value $\beta$ on the drive state is continued for the predetermined period of time (Ts). Alternatively, a time duration from a time at which the rear road wheel acceleration or deceleration $V_{WR}'$ is changed from the acceleration condition to the deceleration condition to a time at which $V_{WR}'$ is recovered from the deceleration condition to the acceleration condition may be measured and the CPU may determine that the four-wheel drive vehicle is running in the two-wheel drive state depending on whether the measured time duration is equal to or above a predetermined period of time.

In the first embodiment, a case wherein the rear left and right road wheels 2RL and 2RR are driven during the two-wheel drive state has been described. Alternatively, the front left and right road wheels (front road wheel pair) may be driven (as mainly driven wheels) during the two-wheel drive state.

The structure of the transfer 6 is shown in FIG. 2. Alternatively, a hydraulic clutch may be used to switch the drive state between the two-wheel drive state and the four-wheel drive state. Furthermore, a clutch engagement force of the hydraulic clutch may be controlled by means of an electromagnetic pressure reduction value on the basis of a difference in the road wheel speeds between the front and rear road wheels. In summary, an arbitrary transfer may be applied in place of the transfer 6 which can arbitrarily select either of the two-wheel drive state or the four-wheel drive state.

In the first embodiment, when the CPU of the anti-skid control circuit 53 determines that the four-wheel drive vehicle is in the four-wheel drive state, such the moderate pressure build-up suppression process for the rear road wheels that the rear road wheel actuator 33R for the rear road wheels is set in the moderate pressure build-up mode only when both of the front left and right road wheel actuators 33FL and 33FR are in the moderate pressure build-up modes is carried out and when the CPU determines that the four-wheel drive vehicle is running in the two-wheel drive state, the moderate pressure build-up suppression process for the rear road wheels is released. Alternatively, the rear road wheel side moderate pressure build-up process may be carried out during the two-wheel drive state and the rear road wheel side barking pressure control process may be halted during the four-wheel drive so that only the brake torque transmitted from the front left and right road wheels may be acted upon the rear left and right road wheels (rear road wheel pair). Otherwise, an arbitrary control pattern which is different in the cases of the the two-wheel drive state and the four-wheel drive state may be adopted.

In addition, the pseudo vehicle body speed calculator 52 is constituted by an electronic circuitry shown in FIG. 5A in the first embodiment. Alternatively, the pseudo vehicle body speed calculator may be constituted by the microcomputer as shown in FIG. 5B.

Although the present invention is applicable to the anti-skid control braking system in the three-sensor-and-three-channel form (system configuration) in the first embodiment, the present invention is also applicable to the anti-skid control braking system in a four-sensor-and-four-channel form in which the wheel speed sensors are individually disposed on the rear left and right road wheels (namely, on all of the front left and right and rear left and right road wheels 2FL through 2RR) or to the anti-skid control braking system in another form.

Although the anti-skid control circuit 53 is constituted by the microcomputer as shown in FIG. 5B, the anti-skid control circuit 53 may be constituted by a combination of the electronic circuits such as comparators, arithmetic circuits, and logic circuits.

In addition, although, in the first embodiment, the two-wheel drive state or the four-wheel drive state is determined depending on whether the state wherein the rear road wheel acceleration or deceleration $V_{WR}'$ positively exceeds the determination threshold value $\beta$ on the drive state is continued for the predetermined period of time, the rear road wheel acceleration or deceleration $V_{WR}'$ may be time filter processed by means of a time filter so as to detect the variation rate of the road wheel acceleration or deceleration $V_{WR}'$.

Furthermore, although, in the first embodiment, the rear road wheel (side) moderate pressure suppression process is carried out in the four-wheel drive state and this suppression process is released during the two-wheel drive state, another control method may be applied to the anti-skid control braking system.

It is noted that each of the pressure reduction mode, the moderate pressure build-up mode, low-pressure hold mode, the high-pressure hold mode, and the rapid pressure build-up mode shown in FIGS. 8 and 9A is exemplified by a U.S. patent application Ser. No. 08/447,586 (which has already been allowed) (which corresponds to a German Patent Application Publication No. DE 195 19 199 A1 published on Dec. 7, 1995), (the disclosure of the U.S. patent application identified above being herein incorporated by reference). (The structure of the four-wheel drive vehicle is exemplified by a U.S. patent application Ser. No. 08/518,319 filed on Aug. 23, 1995 (attorney docket No. 32926/986 ISPC), the disclosure of which being herein incorporated by reference.)

Second Embodiment

A second preferred embodiment of the anti-skid control braking system for the four-wheel drive vehicle will be described below.

It is noted that since the hardware structure of the anti-skid control braking system in the second embodiment is generally the same as that in the first embodiment shown in FIGS. 1, 2, 3, 4, 5A, and 5B, the detailed explanation of the hardware structure with reference to FIGS. 1 through 5B will be omitted herein.

Figure 14:
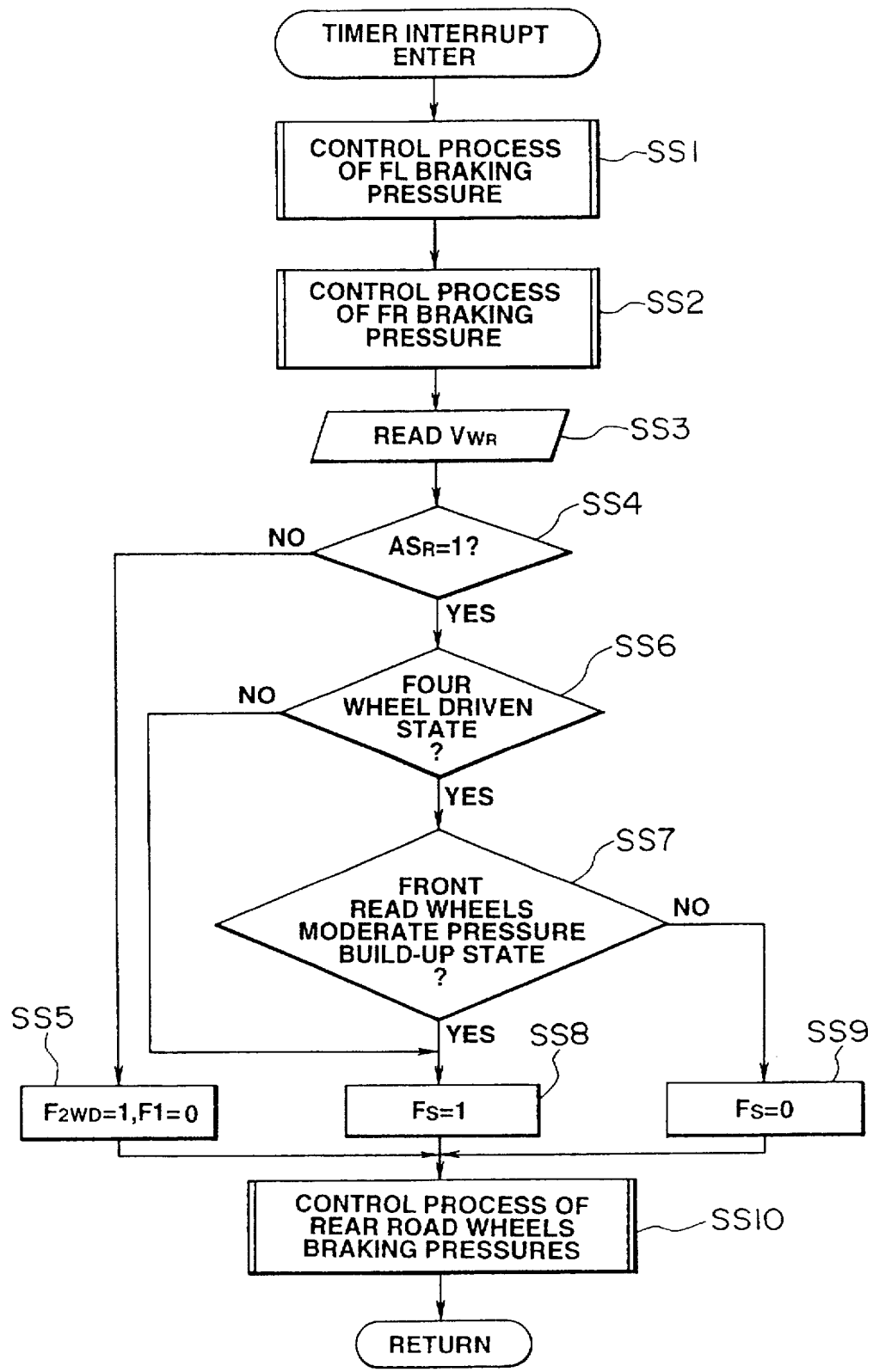
FIG. 14 is an operational flowchart of the control process executed in the anti-skid control circuit in the case of the second preferred embodiment.
Figure 15:
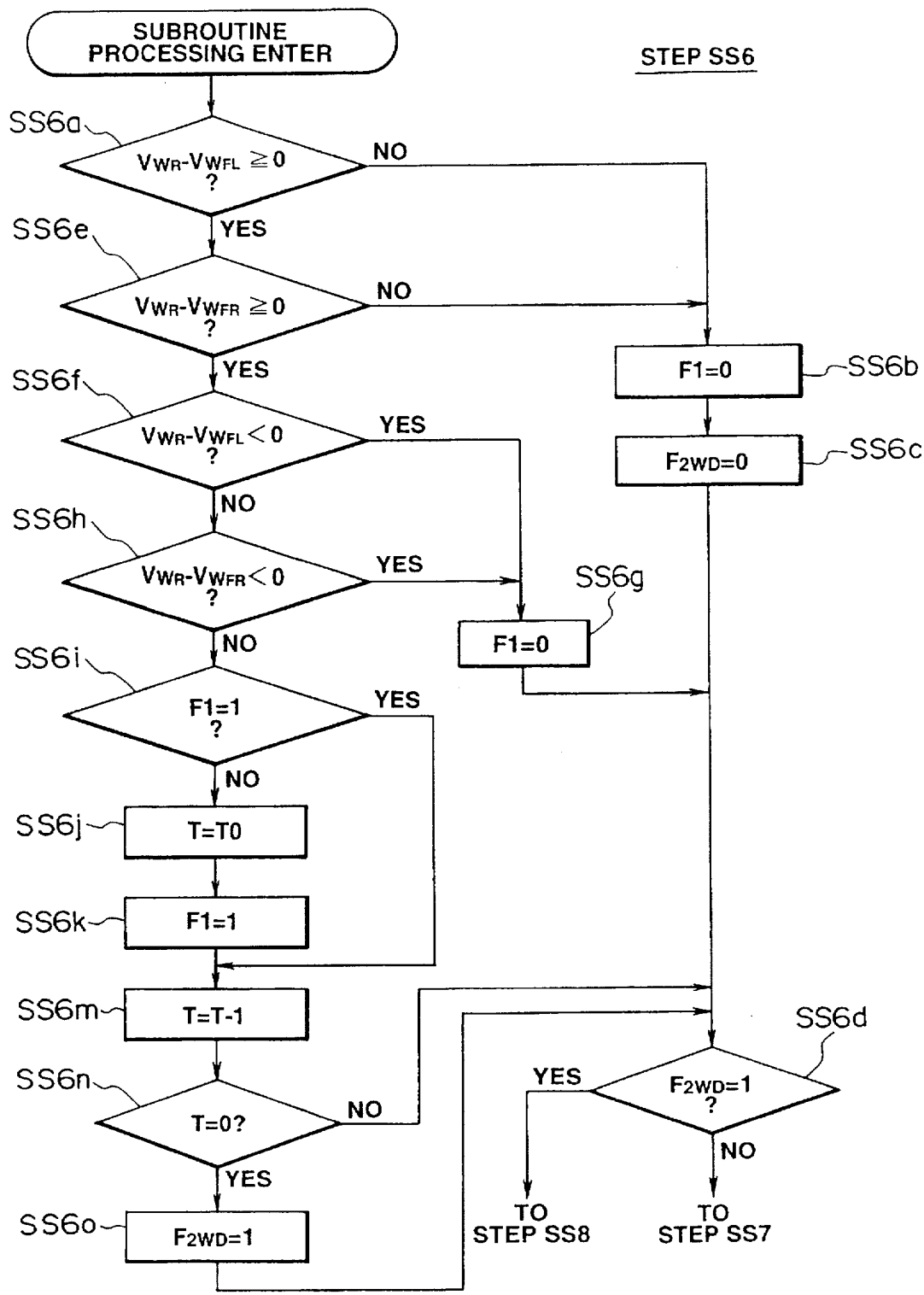
FIG. 15 is an operational flowchart of a subroutine executed at a step SS6 shown in FIG. 14.

FIGS. 14 and 15 show the braking force control process executed by the anti-skid control circuit 53 in the second embodiment. Steps SS1 and SS2 correspond to the steps Si and S2 shown in FIG. 6. The detailed control contents of the steps SS1 and SS2 have already been described in the first embodiment with reference to FIG. 8.

The braking force control process shown in FIG. 14 is executed as the timer interrupt routine for each predetermined period of time, for example, 10 msec. in the same manner as shown in FIG. 6.

At the step SS1, the anti-skid control circuit 53 executes the anti-skid control process for the actuator 33FL for the front left road wheel 2FL.

At the step SS2, the anti-skid control circuit 53 executes the anti-skid control process for the actuator 33FR for the front right road wheel 2FR.

At a step SS3, the CPU of the anti-skid control circuit 53 reads the present rear road wheel speed $V_{WR(N)}$ (N=1, 2, 3, - - -) and, at the next step SS4, the CPU determines whether the anti-skid control flag AS ($AS_R$) is set to "1" in the rear road wheel side braking pressure control process at a step SS10.

If AS=0 ($AS_R$=0) (NO) at the step SS4, the routine goes to a step SS5 (since the CPU determines that the anti-skid control is not started) in which a drive state flag $F_{2WD}$ is set to "1" and a timer-counting status flag F1 is reset to "0" (F1=0).

Then, the routine goes to the step SS10.

On the other hand, if AS=1 ($AS_R$=1) (YES) at the step SS4, the routine goes to a step SS6.

At the step SS6, the CPU compares the rear road wheel speed $V_{WR}$ with each of the front left and right road wheel speeds $V_{WFL}$ and $V_{WFR}$ and determines whether the four-wheel drive vehicle is running in the two-wheel drive state or in the four-wheel drive state depending on whether the rear road wheel speed $V_{WR}$ is above each of the front left and right road wheels $V_{WFL}$ and $V_{WFR}$ and the state wherein the rear road wheel speed $V_{WR}$ is above each of the front left and right road wheels $V_{WFL}$ and $V_{WFR}$ is continued for a predetermined period of time (for example, 350 milliseconds (msec.) or more.

The reason of the determination of the drive state in the four-wheel drive vehicle according to the variation in the rear road wheel acceleration or deceleration $V_{WR}'$ has already been described in the first embodiment with reference to FIGS. 10A, 10B, 11A, and 11B.

Hence, in the second embodiment, the CPU can determine that the four-wheel drive vehicle is running in the two-wheel drive state when the following condition such that there is no possibility of occurring in the four-wheel drive state is satisfied, i.e., the rear road wheel speed $V_{WR}$ in the front left and right road wheel speed opposite-phase states is larger than each of the front left and right road wheel speeds $V_{WFL}$ and $V_{WFR}$ and when the state wherein the rear road wheel vehicle speed $V_{WR}$ in the front left and right road wheel synchronized state is not below (above) each of the front left and right road wheel speeds $V_{WFL}$ and $V_{WFR}$ is continued for the predetermined period of time, as appreciated from FIG. 10A.

FIG. 15 shows the content (subroutine) of the step SS6 shown in FIG. 14.

That is to say, at a step SS6a, the CPU determines whether a speed difference derived by subtracting the front left road wheel speed $V_{WFR}$ from the rear road wheel speed $V_{WR}$ is positive, zero inclusive, ($V_{WR}-V_{WFL} \geq 0$).

If $V_{WR}-V_{WFL}<0$ at the step SS6a (NO), the CPU determines that the four-wheel drive vehicle is running in the four-wheel drive state and the routine goes to a step SS6b.

At the step SS6b, the flag F1 is reset to "0" and the routine goes to a step SS6c in which the flag $F_{2WD}$ is reset to "0". Then, the routine goes to a step SS6d.

At the step SS6d, the CPU determines whether the drive state flag $F_{2WD}$ is set to "1". If $F_{2WD}$=1 (YES) at the step SS6d, the routine goes to a step SS8 shown in FIG. 14. If $F_{2WD}$=0 (NO) at the step SS6d, the routine goes to a step SS7 shown in FIG. 14.

On the other hand, if $V_{WR}-V_{WFL} \geq 0$ (YES) at the step SS6a, the routine goes to a step SS6e.

At the step SS6e, the CPU determines whether a speed difference derived by subtracting the front right road wheel speed $V_{WFR}$ from the rear road wheel speed $V_{WR}$ is positive, zero inclusive ($V_{WR}-V_{WFR} \geq 0$).

If $V_{WR}-V_{WFR}<0$ (NO) at the step SS6f, the routine goes to the step SS6b since the CPU determines that, as the result of the derived speed difference, the four-wheel drive vehicle is running in the four-wheel drive state. If $V_{WR}-V_{WFR} \geq 0$ (YES) at the step SS6e, the routine goes to a step SS6f.

At the step SS6f, the CPU determines whether the speed difference derived by subtracting the front left road wheel speed $V_{WFL}$ from the rear road wheel speed $V_{WR}$ is, in turn, negative.

If $V_{WR}-V_{WFL}<0$ (YES) at the step SS6f, the routine goes to a step SS6g since the four-wheel drive vehicle is determined to be still running in the four-wheel drive state. At the step SS6g, the flag F1 is reset to "0" and the routine goes to the step SS6d.

If $V_{WR}-V_{WFL} \geq 0$ (NO) at the step SS6f, the routine goes to a step SS6h.

At the step SS6h, the CPU determines whether the speed difference derived by subtracting the front right road wheel speed $V_{WFR}$ from the rear road wheel speed $V_{WR}$ is negative. If $V_{WR}-V_{WFR}<0$ (YES) at the step SS6h, the routine goes to the step SS6g.

If $V_{WR}-V_{WFR} \geq 0$ (NO) at the step SS6h, the routine goes to a step SS6i.

At the step SS6i, the CPU determines whether the timer counting status flag F1 representing a time measuring status is set to "1". If F1=1 (YES) at a step SS6i, the routine jumps to a step SS6m since the timer is now counting a time duration. If F1=0 (NO) at the step SS6i, the routine goes to a step SS6j since the timer is now started to count the time duration. At the step SS6j, the CPU presets the timer T to a predetermined count value To which corresponds to, for example, 350 msec. described above and the routine goes to a step SS6k in which the timer counting status flag F1 is set to "1" Then, the routine goes to the step SS6m.

At the step SS6m, the timer count value T is decremented by one (T=T-1).

At the next step SS6n, the CPU determines whether the count value of the timer T is zeroed or not.

This determination is based on whether the state wherein each of the front left and right road wheel speeds $V_{WFL}$ and $V_{WFR}$ is below the rear road wheel speed $V_{WR}$ is continued for the predetermined period of time or more. If T>0 (NO) at the step SS6n, the routine determines that the predetermined period of time (350 msec.) is not yet passed and the routine goes to the step SS6d.

If T=0 (YES) at the step SS6n, the CPU determines that the predetermined period of time (To) has passed and that the vehicle is running in the two-wheel drive state and the routine goes to a step SS6o in which the two-wheel drive state flag $F_{2WD}$ is set to "1".

Then, the routine goes to the step SS6d.

The step SS7 shown in FIG. 14 corresponds to the step S7 shown in FIG. 6, the step SS8 corresponds to the step S8 shown in FIG. 6, and a step SS9 corresponds to the step S9 shown in FIG. 6.

It is noted that the content of the step SS10 generally corresponds to the content of the step S10 shown in FIG. 9A but some steps are added as shown in FIG. 9B, as will be described below.

Since the front road wheel side anti-skid control process at the steps SS1 and SS2 is executed as shown in FIG. 8 which has already been described, the detailed explanations thereof are omitted herein.

On the the hand, in the rear road wheel side anti-skid control process of the step SS10 shown in FIG. 14, the CPU reads $V_{wj}$ (j=FL, FR, R) denoting the respective road wheel speeds at a step 5lr of FIG. 9B, calculates the respective road wheel accelerations or decelerations $V_{wj}'$ at a step S12 of FIG. 9B, and reads the pseudo vehicle body speed Vx at a step S13 of FIG. 9B. Then, the routine of FIG. 9B is transferred to the step S15 of FIG. 9A. The detailed explanations of the subroutine of FIG. 9A have already been made in the first embodiment with reference to FIG. 8 and, therefore, the detailed explanations thereof are omitted herein.

Next, FIGS. 16A through 16F show integrally the timing chart for explaining the operation in the second embodiment of the anti-skid control braking system according to the present invention.

Suppose now that when the two-wheel drive state is selected through the shift lever 28 of the transfer 6, the 2-4 coupling sleeve 27 serves to interrupt the coupled state between the rear-road wheel side output shaft 17 and the sprocket 23 and the L-H coupling sleeve 21 links between the main gear 16 and rear-road wheel side output shaft 17 so as to enter the high-speed range position. This has been described in the case of the first embodiment.

In this state, the driving force transmitted from the power transmission 5 is transmitted to the rear-road wheel side output shaft 17 via the L-H coupling sleeve 21 so as to be transmitted to the rear left and right road wheels 2RL and 2RR via the propeller shaft 10, thus the four-wheel drive vehicle being in the two-wheel drive state in which the rear road wheels only are driven road wheels.

Suppose now that the four-wheel drive vehicle shown in FIG. 1 cruises at a constant speed on the good road at the time $t_0$ shown in FIGS. 16A through 16F under the non-braking condition.

At the time $t_0$, since, in the anti-skid control block 46 shown in FIG. 4, the pseudo vehicle body speed Vx and each of the road wheel speeds $V_{wj}$ (j=FL, FR, R) are coincident with each other, each slip rate $S_j$ ($S_R$ inclusive) calculated at the step S14 of FIG. 8 (and FIG. 9B) indicates zero. Under the non-braking condition, the routine shown in FIG. 8 (FIG. 9A) is transferred from the step S15 to the step S16 in which zero is selected as the value of the pressure reduction timer L and is transferred to the step S17.

Since, at the step S17, the vehicle is under the non-braking condition and the CPU determines that the control end condition is satisfied, the routine goes to the step S18 in which the pressure reduction timer L and the anti-skid control flag AS ($AS_F$ and $AS_R$) are cleared to zeros and the routine goes to the step S19 in which the rapid pressure build-up mode for each actuator 33FL, 33FR, and 33R is set.

It is noted that since, in the rapid pressure build-up mode, the actuator 33i serves to communicate the master cylinder 32 with each wheel cylinder 4i (i=FL, FR, RL, and RR) and the brake pedal 31 is not depressed, the pressure in the master cylinder 32 indicates approximately zero and the pressure in the wheel cylinder 4i also maintains in the approximately zero state so that the non-braking state is maintained.

Suppose now that, at the time $t_1$ from the time $t_0$ at which the vehicle is under the non-braking condition and under the cruise run state, the brake pedal 31 is depressed to enter the braking condition so that the master cylinder pressure of the master cylinder 32 is rapidly increased (built up).

Since, at the time $t_1$, the actuator 33j is set in the rapid pressure build-up mode, the cylinder pressures $P_{WCFL}$, $P_{WCFR}$, and $P_{WCR}$ of the respective wheel cylinders 4FL, 4FR, 4RL, and 4RR for the respective road wheels 2FL, 2FR, 2RL, and 2RR are rapidly increased as shown in FIGS. 16B, 16C, and 16D so as to become equal to the master cylinder pressure.

Due to the rapid increase in the cylinder pressures of the respective wheel cylinders 4FL, 4FR, 4RL, and 4RR, the road wheel speeds $V_{WFL}$ and $V_{WFR}$ of the front road wheels 2FL and 2FR which provide non-driven road wheels are relatively rapidly decreased. However, the rear road wheel speed $V_{WR}$ of the rear road wheels which provide the driven road wheels receives the influence of the engine inertia and engine brake so as to be moderately decreased.

In order to clarify the synchronized state of the respective road wheels, FIG. 16A depicts the front road wheel side road wheel speeds $V_{WFL}$ and $V_{WFR}$ which are separate from the rear road wheel speed $V_{WR}$ in the same way as shown in FIG. 12A.

When, as described above at the time $t_1$, the braking condition is entered, the pseudo vehicle body speed calculator 52 selects the rear road wheel speed $V_{WR}$ as the select-high road wheel speed VW, during the time duration to the time $t_3$.

When the predetermined period of time $T_3$ which is set by the off delay timer 52j has passed after the selected road wheel speed $V_{WR}$ is reduced by 1 Km/h than the pseudo vehicle body speed Vx which provides the road wheel speed sampled value Vs of the sample hold circuit 52a before the time $t_1$, the selector 52k selects the vehicular forward/rearward acceleration correction value $X_{GC}$ corrected so as to add the vehicular forward/rearward acceleration value $X_G$ outputted from the output correction circuit 52e to the off-set value as the integration input voltage E.

The integration input voltage E is integrated by the integration 52f and the integrated voltage Ve is supplied to the adder 52g as the negative speed correction value.

Since the adder 52g subtracts the negative speed correction value from the road wheel speed sampled value Vs, the pseudo vehicle body speed Vx is reduced according to the decrease in the vehicle body speed.

Next, at the time $t_6$, the reduced pseudo vehicle speed Vx becomes approximately coincident with the front right road wheel speed $V_{WFR}$ selected as the select-high road wheel speed $V_{WH}$.

The present front right road wheel speed $V_{WFR}$ is held as the road wheel speed sampled value Vs.

Thereafter, when the select-high road wheel speed $V_{WH}$ exceeds the dead zone and the predetermined time $T_3$ has passed, the anti-skid control is started.

When the control signal MR is set to the logical value of one, the selector 52k selects the negative voltage corresponding to +10G and this is inputted to the integrator 52f as the integration input voltage E. Thus, the pseudo vehicle body speed Vx is rapidly increased so as to follow up the select-high road wheel speed $V_{WH}$. Thereafter, when the select-high road wheel speed $V_{WH}$ is reduced by 1 Km/h than the pseudo vehicle body speed $V_X$, the select-high road wheel speed is reduced by the gradient corresponding to the forward or rearward acceleration $X_G$.

On the other hand, when each of the front left and right road wheel acceleration or deceleration $V_{WFL}'$ and $V_{WFR}'$ is reduced to become equal to or smaller than the deceleration threshold value $-\alpha_2$, the routine shown in FIG. 8 is transferred to the step S24 via the steps S11 through S17, S20, S22, and S23 so that each corresponding actuator 33FL and 33FR is set in the high-pressure hold mode. In the high-pressure hold mode, the inflow valve 35 and the outflow valve 36 are both in the closed states so that the cylinder pressures $P_{WCFL}$ and $P_{WCFR}$ are held under the high pressures as shown in FIGS. 16B and 16C.

Thereafter, when, at the time $t_3$, the road wheel slip rate $S_{FR}$ of the front right road wheel 2FR is reduced to become equal to or lower than the target slip rate So (this means that the absolute value of the slip rate $S_{FR}$ is equal to or larger than the target slip rate (YES) at the step S15) and the front right road wheel speed $V_{WFR}$ is reduced to become equal to or lower than the target road wheel speed $V_W^*$ denoted by the dot-and-dash line of FIG. 16A, the routine shown in FIG. 8 is transferred from the step S15 to the step S29.

Since the front right road wheel acceleration or deceleration $V_{WFR}'$ is below the acceleration threshold value $+\alpha_1$ (NO at the step S29), the routine goes to the step S31 in which the anti-skid control flag AS is set to one and the pressure reduction timer L is preset to the predetermined value Lo.

Hence, when the routine is transferred to the step S20, L>0 so that the routine is transferred to the step S21 in which the pressure reduction mode is set so that the cylinder pressure $P_{WCFR}$ for the front right road wheel 2FR is rapidly reduced as shown in FIG. 16C and thereafter the actuator 33FR for the front right road wheel 2FR is in the low-pressure hold mode.

Thereafter, since the road wheel speed $V_{WFL}$ of the front left road wheel 2FL at the time $t_4$ is below the target road wheel speed $V_W^*$, the actuator 33FL is in the pressure reduction mode and the cylinder pressure $P_{WCFL}$ of the front left road wheel 2FL is rapidly reduced and thereafter in the low-pressure hold mode.

In this way, when the wheel cylinder pressures $P_{WCFR}$ and $P_{WCFL}$ for the front left and right road wheels 2FL and 2FR are reduced, the braking forces applied to the front left and right road wheels are reduced so that the front left and right road wheel speeds $V_{WFL}$ and $V_{WFL}$ are turned from the decreasing tendency to the increase tendency.

During the time duration from the time $t_1$ to the time $t_4$, since the rear road wheel side acceleration or deceleration $V_{WR}'$ indicates the negative deceleration as shown in FIG. 16E and the anti-skid control flag AS ($AS_R$) at the step S25 is reset to zero, the routine shown in FIG. 14 is transferred from the step SS5 to the step SS10 in which the rear road wheel braking force (pressure) control process is executed.

When, at the time $t_3$, the rear road wheel acceleration or deceleration $V_{WR}'$ becomes below the deceleration threshold value $-\alpha_2$ the routine shown in FIG. 9A (FIG. 9B) is transferred from the step S23 to the step S24 when the rear road wheel side braking force control process is executed so that the actuator 33R is set in the high-pressure hold mode. Thus, the rear road wheel side wheel cylinder pressure $P_{WCR}$ is held at the high pressure value as shown in FIG. 16D.

The rear road wheel speed $V_{WR}$ of the rear road wheels 2RL and 2RR at the time $t_3$ is moderately reduced as shown in FIG. 16A. At the time $t_5$, when the rear road wheel slip rate $S_R$ exceeds the target slip rate So and the rear road wheel speed $V_{WR}$ is below the target road wheel speed $V_W^*$, the routine shown in FIG. 9A (FIG. 9B) is transferred from the step S15 via the step S29 to the step S31 in which the anti-skid flag AS is set to one and the pressure reduction timer L is preset to the set value Lo.

Then, the routine shown in FIG. 9A (FIG. 9B) is transferred to the step S21 via the steps S17 and S20 in which the pressure reduction mode is set. Thus, the rear road wheel side wheel cylinder pressure $P_{WCR}$ is rapidly reduced as shown in FIG. 16D.

In this way, since the anti-skid control flag $AS_R$ is set to one in the rear road wheel side braking force control process of FIG. 9A (FIG. 9B), the braking force control process of FIG. 14 is executed in which the routine is transferred from the step SS4 to the step SS6 in which the subroutine shown in FIG. 15 is executed.

In this way, since the anti-skid control flag $AS_R$ is set to one in the rear road wheel side braking force control process of FIG. 9A (FIG. 9B), the braking force control process of FIG. 14 is executed in which the routine is transferred from the step SS4 to the step SS6 in which the subroutine of FIG. 15 is executed.

At the time $t_5$, the rear road wheel speed $V_{WR}$ is above each of the road wheel speeds $V_{WFL}$ and $V_{WFR}$ of the front left and right road wheels 2FL and 2FR as shown in FIG. 16A.

Then, the routine shown in FIG. 15 is transferred to the step SS6i from the step SS6a via the steps SS6e, SS6f, and SS6h. Since, with the anti-skid control flag $AS_R$ reset to zero, the timer counting status flag F1 is reset to zero, the routine shown in FIG. 15 is transferred to the step SS6j in which the count value of the timer T is preset to the predetermined count value To and is transferred to the step SS6m in which the count value of the timer T is decremented by one (T=T−1).

Since, at the time $t_5$, the timer T has been preset at the step SS6j, T>0 at the step SS6n (NO) and the routine shown in FIG. 15 is transferred to the step SS10 shown in FIG. 14 via the step SS8.

However, since, in this state, the rear road wheel deceleration $V_{WR}'$ indicates negative and is smaller than the acceleration threshold value $\alpha_1$ the wheel cylinder pressure $P_{WCR}$ for the rear road wheels 2RL and 2RR is continued in the pressure reduction state.

Thereafter, at the time $t_6$, the front right road wheel speed $V_{WFR}$ is above the rear road wheel speed $V_{WR}$. At this time, the routine shown in FIG. 15 is transferred from the step SS6e to the step SS6b in which the timer counting status flag F1 is reset to zero and to the step SS6c in which the drive state flag $F_{2WD}$ is reset to zero indicating the four-wheel drive state. Then, the routine shown in FIG. 15 is transferred to the step SS6d and the decrement of the timer T is halted.

Therefore, the routine shown in FIG. 14 is transferred to the step SS7. At the time $t_6$, the moderate pressure build-up mode is set only for the front right road wheel 2FR and the wheel cylinder pressure $P_{WCFR}$ is increased in the stepwise manner.

However, since the pressure reduction mode for the front left road wheel 2FL is continued, the routine shown in FIG. 14 is transferred to the step SS9 in which the moderate pressure increase (build-up) mode enabling flag Fs is reset to zero and the rear road wheel side braking pressure control process at the step SS10 shown in FIG. 14 is entered.

At the time $t_6$, since the rear road wheel acceleration or deceleration $V_{WR}'$ is not above the acceleration threshold value $\alpha_1$, the routine shown in FIG. 9A (FIG. 9B) is transferred from the step S29 to the step S31 in which the pressure reduction timer L is preset to the value of Lo and the routine shown in FIG. 9A (FIG. 8) is transferred to the step S21 in which the actuator 33R for the rear road wheel is continued in the low-pressure reduction mode Thereafter, at the time $t_7$, the rear road wheel acceleration or deceleration $V_{WR}'$ is equal to or above the acceleration threshold $\alpha_1$ as shown in FIG. 16E. At this time, the routine shown in FIG. 9A (FIG. 9B) is transferred from the step SS7 to the step SS8 in which the moderate pressure build-up enabling flag Fs is set to one and the rear road wheel side braking pressure control process at the step SS10 is executed.

At the time $t_8$, the rear road wheel acceleration or deceleration $V_{WR}'$ is below the acceleration threshold value $\alpha_1$ as shown in FIG. 16E.

At this time, the routine shown in FIG. 9A (FIG. 9B) is transferred from the step S22 to the step S32 via the steps S23 and S25 in which the moderate pressure build-up enabling flag Fs is set to one.

Thereafter, the routine shown in FIG. 9A (FIG. 9B) is transferred to the step S26 in which the actuator 33R for the rear road wheels 2RL and 2RR is set in the moderate pressure build-up mode.

Therefore, the wheel cylinder pressure $P_{WCR}$ of the rear left and right road wheels 2RL and 2RR is incremented in the stepwise manner as shown in FIG. 16E.

At the time $t_9$, the actuator 33FR of the front right road wheel 2FR is transferred into the pressure reduction mode and the routine shown in FIG. 14 is transferred from the step SS7 to the step SS9 in which the moderate pressure build-up enabling flag Fs is reset to zero.

Thus, when the routine shown in FIG. 9A (FIG. 9B) is executed, the routine is transferred from the step S32 to the step S28 in which the hold mode is set.

Consequently, the wheel cylinder pressure $P_{WCR}$ for the rear road wheels 2RL and 2RR is held under a high pressure to some degree which is increased by the moderate pressure build-up mode at the previous processing time, as shown in FIG. 16E.

At the time $t_{10}$, the rear road wheel speed $V_{WR}$ is recovered to the value exceeding the road wheel speeds $V_{WFL}$ and $V_{WFR}$ of the front left and right road wheels 2FL and 2FR.

At this time, the routine shown in FIG. 15 is transferred to the step SS6$j$ via the steps SS6$a$, SS6$e$, SS6$f$, SS6$h$, and SS6$i$. At the step SS6$j$, the timer T is preset to the predetermined value To as shown in FIG. 16F.

In this state, the count value of the timer T does not indicate zero and the routine shown in FIG. 15 is transferred to the step SS6$d$.

Consequently, since the drive state flag $F_{2WD}$ continues to be set to zero representing the four-wheel drive state set at the previous processing time, the moderate pressure build-up suppression mode at the rear road wheel side is continued and the rear road wheel side wheel cylinder $P_{WCR}$ is held as shown in FIG. 16D.

However, after the time $t_{10}$, the state where the rear road wheel speed $V_{WR}$ is above each of the front left and right road wheel speeds $V_{WFR}$ and $V_{WFL}$ is continued. Thus, the count value of the timer T is gradually reduced as shown in FIG. 16F.

When the count value indicates zero at the time $t_{11}$ as shown in FIG. 16F, the routine shown in FIG. 14 is transferred from the step SS6$n$ to the step SS6$o$ in which the drive state flag $F_{2WD}$ is set to one representing the two-wheel drive state.

Thus, the routine shown in FIG. 15 is transferred from the step SS6$d$ to the step SS8 in which the moderate pressure build-up mode enabling flag Fs is set to one so as to release the rear road wheel side moderate pressure build-up suppression process and the routine shown in FIG. 15 is transferred to the step SS10.

At the time $t_{11}$, the rear road wheel acceleration or deceleration $V_{WR}'$ indicates an intermediate value between the acceleration threshold value $\alpha_1$ and deceleration threshold value $-\alpha_2$. At this time, since the moderate pressure build-up enabling flag Fs is set to one, the routine shown in FIG. 9A (FIG. 9B) is transferred from the step S32 to the step S26 in which the actuator 33R for the rear road wheels is set in the moderate pressure build-up mode so that the wheel cylinder pressure $P_{WCR}$ of the rear road wheels 2RL and 2RR is increased in the stepwise manner as shown in FIG. 16D.

At the time $t_{12}$, since the road wheel speed $V_{WFL}$ for the front left road wheel 2FL is above the rear road wheel speed $V_{WR}$, the routine shown in FIG. 15 is transferred from the step SS6$a$ to the step SS6$b$ in which the timer counting status flag F1 is reset to zero and to the step SS6$c$ in which the drive state flag $F_{2WD}$ is reset to zero representing the four-wheel drive state so that the actuator 33R for the rear left and right road wheels 2RL and 2RR is recovered into the moderate pressure build-up suppression process.

Thereafter, at the time $t_{13}$, when the road wheel speed $V_{WR}$ of the rear road wheels 2RL and 2RR is above each of the front left and right road wheel speeds $V_{WFL}$ and $V_{WFR}$, the timer T is preset to the predetermined count value To and the decrement of the timer T is entered.

At the time $t_{14}$, the count value of the timer T indicates zero.

The routine shown in FIG. 15 is, then, transferred from the step SS6$n$ to the step SS6$o$ in which the drive state flag $F_{2WD}$ is set to one representing the two-wheel drive state so that the moderate pressure build-up suppression process for the rear road wheels 2RL and 2RR is released.

Thus, the actuator 33R for the rear road wheels 2RL and 2RR is immediately set in the moderate pressure build-up mode. As shown in FIG. 16D, the wheel cylinder $P_{WCR}$ of the rear road wheels 2RL and 2RR is increased in he stepwise manner.

At the time $t_{15}$, since the road wheel speed $V_{WFR}$ of the front right road wheel 2FR is above the rear road wheel speed $V_{WR}$, the CPU determines again that the four-wheel drive state is entered and the actuator 33R for the rear road wheels falls in the moderate pressure build-up suppression process.

In this way, when the two-wheel drive state is determined at the step SS6 of FIG. 14, the moderate pressure build-up suppression process is released for the rear road wheels. Thus, the opportunity of the setting of the rear road wheels in the pressure reduction mode is increased and the braking distance during the anti-skid control operation can be shortened in the same way as described in the first embodiment.

Next, when the shift lever 28 of the transfer 6 is linked to the 4H position from the two-wheel drive state, the 2-4 coupling sleeve 27 is linked to the front drive sprocket 23 to enter the four-wheel drive state.

At this time, the driving torque transmitted to the input shaft 15 from the power transmission 5 is transmitted to the rear road wheel side output shaft 17 and to the front road wheel side output shaft 24 via the drive chain 26 so that the four-wheel drive vehicle is in the four-wheel drive state.

FIGS. 17A through 17F integrally show a timing chart for explaining the operation of the second embodiment in the anti-skid control braking system in the four-wheel drive state described above.

The similar braking pressure control process as in the two-wheel drive state is executed.

That is to say, in the four-wheel drive state, the road wheel speed $V_{WR}$ detected for the rear left and right road wheels 2RL and 2RR indicates the average value of the front left and right road wheel speeds $V_{WFL}$ and $V_{WFR}$ as shown in FIG. 17A since the rear road wheel speed $V_{WR}$ is the detection value of the rotation speed of the propeller shaft 10. At the front left and right road wheels 2FL and 2FR, the left and right road wheel speeds $V_{WFL}$ and $V_{WFR}$ tend to be alternatingly increased and decreased.

Suppose now that the actuator 33FL for the front right road wheel 2FL is in the high-pressure hold mode at the time $t_{20}$ of FIGS. 17A through 17F, the corresponding wheel cylinder pressure $P_{WCFL}$ is relatively high pressure state as shown in FIG. 17B, the actuator 33FR for the front right road wheel 2FR is in the low-pressure hold mode as shown in FIG. 17C, the anti-skid control flag AS for the rear road wheel side is set to one, and the drive state flag $F_{2WD}$ is reset to zero.

At the time $t_{20}$, since the rear road wheel speed $V_{WR}$ is below the road wheel speed $V_{WFL}$ of the front left road wheel 2FL as shown in FIG. 17A, the routine shown in FIG. 15 is transferred from the step SS6a to the step SS6b so that the timer counting status flag F1 is reset to zero and is transferred to the step SS6c in which the drive state flag $F_{2WD}$ is reset to zero representing the four-wheel drive state.

Thus, the decrement of the timer T is not executed and the determination of the four-wheel drive state is continued.

Then, the routine shown in FIG. 14 is transferred from the step SS6 to the step SS7. The moderate pressure build-up mode enabling flag Fs is set to one only when the actuators 33FL and 33FR for the front left and right road wheels 2FL and 2FR are both in the moderate pressure build-up mode.

At the time $t_{20}$, since neither the actuator 33FL nor the actuator 33FR for the front left and right road wheels 2FL and 2FR is in the moderate pressure build-up mode, the routine shown in FIG. 14 is transferred to the step SS9 in which the moderate pressure build-up mode enabling flag Fs is reset to zero.

Since the rear road wheel acceleration or deceleration $V_{WR}'$ is below the acceleration threshold $\alpha_1$ as shown in FIG. 17E so that although the wheel cylinders 4RL and 4RR for the rear left and right road wheels 2FL and 2FR are in the pressure build-up enabled states, the routine shown in FIG. 9A (FIG. 9B) is transferred from the step S32 to the step S28 so that the transfer of the pressure mode to the moderate pressure build-up mode is suppressed and the low-pressure hold mode is continued. Thus, the wheel cylinder pressure $P_{WCR}$ for the rear road wheels 2RL and 2RR is held under the low-pressure condition as shown in FIG. 17D.

Thereafter, during the time duration up to the time $t_{25}$, either the front left or front right road wheel speed $V_{WFL}$ or $V_{WFR}$ is above the rear road wheel speed $V_{WR}$. When the routine shown in FIG. 14 is executed, the same processing as that at the time $t_{20}$ is repeated so that the drive state flag $F_{2WD}$ is reset to zero and the rear road wheel side moderate pressure build-up suppression process is continued.

At the time $t_{25}$, since the moderate pressure build-up modes are set in the actuators 33FL and 33FR for the front left and right road wheels 2FL and 2FR, the routine shown in FIG. 14 is transferred from the step SS7 to the step SS8 in which the moderate pressure build-up (increase) enabling flag Fs is set to one, the routine shown in FIG. 9A (FIG. 9B) is transferred from the step S32 to the step S26 in which the rear road wheel actuator 33R is set in the moderate pressure build-up mode and the wheel cylinder pressure $P_{WCR}$ for the rear left and right road wheels 2RL and 2RR is increased in the stepwise manner as shown in FIG. 17D.

Thereafter, at the time $t_{26}$, since the rear road wheel speed $V_{WR}$ is coincident with each of the road wheel speeds $V_{WFL}$ and $V_{WFR}$ of the front left and right road wheels 2FL and 2FR, the routine shown in FIG. 15 is executed and, at this time, the routine shown in FIG. 15 is transferred to the step SS6j in which the timer T is preset to the predetermined count value To and the decrement of the timer T is started. However, at a time immediately after the time $t_{26}$, since the road wheel speed $V_{WFL}$ on the front left road wheel 2FL is above the rear road wheel speed $V_{WR}$, the drive state flag $F_{2WD}$ continues to be reset to zero.

At the time $t_{29}$, since the moderate pressure build-up mode is set for the front left and right road wheels, the moderate pressure build-up mode enabling flag Fs is again set to one. At this time, since the rear road wheel acceleration or deceleration $V_{WR}'$ is below the acceleration threshold value $\alpha_1$, the actuator 33R for the rear road wheels is set in the moderate pressure build-up mode.

Thereafter, at the time $t_{30}$, since the rear road wheel speed $V_{WR}$ is coincident with each of the road wheel speeds $V_{WFL}$ and $V_{WFR}$ of the front left and right road wheels 2FL and 2FR, the timer T is preset to the predetermined count value To.

Immediately after the time $t_{30}$, the road wheel speed $V_{WFL}$ for the front left road wheel 2FL is above the rear road wheel speed $V_{WR}$. Thus, the drive state flag $F_{2WD}$ is continued to be reset to zero. It is noted that "1" denotes one and "0" denotes zero.

The advantages and alternatives in the second embodiment are generally the same as described in the first embodiment.

What is claimed is:

1. An anti-skid control braking system for a four-wheel drive vehicle, said vehicle having mainly driven road wheels and secondarily driven road wheels, and a transfer mechanism which is so arranged and constructed as to be selectable between a two-wheel drive state in which a driving force passed from a power transmission is distributed therethrough only toward the mainly driven road wheels and a four-wheel drive state in which the driving force passed from the power transmission is distributed therethrough toward both of the mainly and secondarily driven road wheels at a predetermined distribution ratio, said anti-skid control braking system comprising:

a plurality of road wheel speed sensors which are so arranged and constructed as to detect road wheel speeds of at least two of the secondarily driven road wheels and one of the mainly driven road wheels, and so as to produce respective road wheel speed signals indicative of the respectively detected road wheel speeds of the mainly and secondarily driven road wheels;

a plurality of braking cylinders associated with the mainly and secondarily driven road wheels;

braking pressure controlling means for independently controlling braking pressures of the respective braking cylinders on the basis of values of the respective road wheel speed signals in an anti-skid control mode; and drive state determining means for determining whether the four-wheel drive vehicle is running in the two-wheel drive state or in the four-wheel drive state on the basis of the value of at least one of the respective road wheel speed signals of the one of the mainly driven road wheels, wherein said braking pressure controlling means independently controls the braking pressures of the respective braking cylinders according to a result of the determination by the drive state determining means, wherein said braking pressure controlling means modifies the anti-skid control mode for the mainly driven road wheels according to a result of determination of whether the four-wheel drive vehicle is running in the two-wheel drive state or in the four-wheel drive state by said drive state determining means, wherein said mainly driven road wheels are rear left and right road wheels (2RL and 2RR) and said secondarily driven road wheels are front left and right road wheels (2FL and 2FR), wherein said one of road wheels sensors which is so arranged and constructed as to detect the road wheel speed of the one of the mainly driven road wheels is a rear road wheel side road wheel speed sensor located on a rear road wheel side propeller shaft connected to said transfer mechanism for detecting a rotation speed of the propeller shaft as the value of the wheel speed ($V_{WR}$) of the one of the rear left and right road wheels, and wherein said drive state determining means comprises: rear road wheel side road wheel acceleration or deceleration determining means for determining a rear road wheel side wheel acceleration or deceleration ($V_{WR}'$) as a function of the rear road wheel speed signal detected by the rear road wheel side road wheel speed sensor; and second drive state determining means for determining whether the rear road wheel side road wheel acceleration or deceleration ($V_{WR}'$) is either less than a first predetermined value or greater than a second predetermined value, said second predetermined value being greater than said first predetermined value, said drive state determining means determining that the four-wheel drive vehicle is running in the four-wheel drive state when said second drive state determining means determines that the value of the rear road wheel side acceleration or deceleration ($V_{WR}'$) is greater than said second predetermined value.

2. An anti-skid control braking system for a four-wheel drive vehicle, said vehicle having mainly driven road wheels and secondarily driven road wheels as claimed in claim 1, wherein said second drive state determining means comprises comparing means for comparing a variation rate of the rear road wheel side road wheel acceleration or deceleration ($V_{WR}'$) with a previously set drive state determination threshold value ($\beta$) and said drive state determining means determines that the four-wheel drive vehicle is in the four-wheel drive state when said variation rate in the rear road wheel deceleration is smaller than the drive state determination threshold value in a negative direction as expressed as $V_{WR}' < \beta$, wherein said second drive state determining means further comprises a timer (T) which starts a counting of time when said rear road wheel side acceleration or deceleration ($V_{WR}'$) is equal to or larger than the drive state determination threshold value ($\beta$) expressed as $V_{WR}' \geq \beta$ and which ends the counting when a predetermined period of time (To) has passed, and wherein said driving state determining means determines that the four-wheel drive vehicle is running in the two-wheel drive state when a condition in which such the expression as $V_{WR}' \geq \beta$ continues for the predetermined period of time (To) set by the timer T.

3. An anti-skid control braking system for a four-wheel drive vehicle, said vehicle having mainly driven road wheels and secondarily driven road wheels as claimed in claim 2, wherein said anti-skid control mode is divided into a pressure reduction mode, a high-pressure hold mode, a moderate pressure build-up mode, a low-pressure hold mode, and a rapid pressure build-up mode, and wherein said braking pressure controlling means modifies the anti-skid control mode so as to execute a moderate pressure build-up mode suppression process for the rear road wheels such that the moderate pressure build-up modes for the rear left and right road wheels are enabled only when the moderate pressure build-up modes for both of the front left and right road wheels are executed as the anti-skid control mode, when said drive state determining means determines that the four-wheel drive vehicle is running in the four-wheel drive state.

4. An anti-skid control braking system for a four-wheel drive vehicle, said vehicle having mainly driven road wheels and secondarily driven road wheels as claimed in claim 3, wherein said braking pressure controlling means executes the anti-skid control mode so as to release the moderate pressure build-up mode suppression process when said drive state determining means determines that the four-wheel drive vehicle is, in turn, running in the two-wheel drive state.

5. An anti-skid control braking system for a four-wheel drive vehicle, said vehicle having mainly driven road wheels and secondarily driven road wheels as claimed in claim 4, wherein said predetermined period of time is approximately 250 milliseconds.

6. An anti-skid control braking system for a four-wheel drive vehicle, said vehicle having mainly driven road wheels an secondarily driven road wheels as claimed in claim 5, wherein said previously set drive state determination threshold value ($\beta$) corresponds to a predictable maximum value of the deceleration of the four-wheel drive vehicle.

7. An anti-skid control braking system for a four-wheel drive vehicle, said vehicle having mainly driven road wheels and secondarily driven road wheels as claimed in claim 6, wherein said previously set drive state determination threshold value ($\beta$) corresponds to −0.35 G.

8. An anti-skid control braking system for a four-wheel drive vehicle, said vehicle having mainly driven road wheels and secondarily driven road wheels, and a transfer mechanism which is so arranged and constructed as to be selectable between a two-wheel drive state in which a driving force passed from a power transmission is distributed therethrough only toward the mainly driven road wheels and a four-wheel drive state in which the driving force passed from the power transmission is distributed therethrough toward both of the mainly and secondarily driven road wheels at a predetermined distribution ratio, said anti-skid control braking system comprising:

a plurality of road wheel speed sensors which are so arranged and constructed as to detect road wheel speeds of at least two of the secondarily driven road wheels and one of the mainly driven road wheels, and so as to produce respective road wheel speed signals indicative of the respectively detected road wheel speeds of the mainly and secondarily driven road wheels;

a plurality of braking cylinders associated with the mainly and secondarily driven road wheels;

a braking pressure controlling unit coupled to the road wheel sensors and the braking cylinders, the braking pressure controlling unit configured to independently control braking pressures of the respective braking cylinders on the basis of values of the respective road wheel speed signals in an anti-skid control mode; and a drive state determining unit coupled to the braking pressure controlling unit and configured to determine whether the four-wheel drive vehicle is running in the two-wheel drive state or in the four-wheel drive state on the basis of the value of at least one of the respective road wheel speed signals of the one of the mainly driven road wheels, wherein said braking pressure controlling unit independently controls the braking pressures of the respective braking cylinders according to a result of the determination by the drive state determining unit, wherein said braking pressure controlling unit modifies the anti-skid control mode for the mainly driven road wheels according to a result of determination of whether the four-wheel drive vehicle is running in the two-wheel drive state or in the four-wheel drive state by the drive state determining unit, wherein said mainly driven road wheels are rear left and right road wheels (2RL and 2RR) and said secondarily driven road wheels are front left and right road wheels (2FL and 2FR), wherein said one of road wheels sensors which is so arranged and constructed as to detect the road wheel speed of the one of the mainly driven road wheels is a rear road wheel side road wheel speed sensor located on a rear road wheel side propeller shaft connected to said transfer mechanism for detecting a rotation speed of the propeller shaft as the value of the wheel speed ($V_{WR}$) of the one of the rear left and right road wheels, and wherein said drive state determining unit comprises: a rear road wheel side road wheel acceleration or deceleration determining unit configured to determine a rear road wheel side wheel acceleration or deceleration ($V_{WR}'$) as a function of the rear road wheel speed signal detected by the rear road wheel side road wheel speed sensor; and a second drive state determining unit configured to determine whether the rear road wheel side road wheel acceleration or deceleration ($V_{WR}'$) is either less than a first predetermined value or greater than a second predetermined value, said second predetermined value being greater than said first predetermined value, said drive state determining unit configured to determine that the four-wheel drive vehicle is running in the four-wheel drive state when said second drive state determining unit determines that the value of the rear road wheel side acceleration or deceleration ($V_{WR}'$) is greater than said second predetermined value.

9. An anti-skid control braking system for a four-wheel drive vehicle, said vehicle having mainly driven road wheels and secondarily driven road wheels as claimed in claim 8, wherein said second drive state determining unit comprises a comparing unit configured to compare a variation rate of the rear road wheel side wheel acceleration or deceleration ($V_{WR}'$) with a drive state determination threshold value, and said drive state determining unit determines that the four-wheel drive vehicle is in the four-wheel drive state when the variation rate is less than the drive state determination threshold value.

10. An anti-skid control braking system for a four-wheel drive vehicle, said vehicle having mainly driven road wheels and secondarily driven road wheels as claimed in claim 9, wherein said second drive state determining unit further comprises a timer which starts a counting of time when said rear road wheel side acceleration or deceleration ($V_{WR}'$) is greater than the drive state determination threshold value, and which ends the counting of time when a predetermined period of time has passed, and wherein said drive state determining unit determines that the four-wheel drive vehicle is running in the two-wheel drive state when a condition occurs in which said rear road wheel side acceleration or deceleration ($V_{WR}'$) is greater than the drive state determination threshold value at all times within the predetermined period of time.

* * * * *